(12) United States Patent
Strong

(10) Patent No.: US 7,527,117 B2
(45) Date of Patent: May 5, 2009

(54) VEHICLE WITH ACTIVELY ADJUSTABLE AXLE SYSTEM

(75) Inventor: Russell W. Strong, Craftsbury Common, VT (US)

(73) Assignee: Integrated Vision, Inc., Craftsbury Common, VT (US)

( * ) Notice: Subject to any disclaimer, the term of this patent is extended or adjusted under 35 U.S.C. 154(b) by 1007 days.

(21) Appl. No.: 10/610,485

(22) Filed: Jun. 30, 2003

(65) Prior Publication Data

US 2006/0032691 A1 Feb. 16, 2006

Related U.S. Application Data

(60) Provisional application No. 60/392,329, filed on Jun. 28, 2002.

(51) Int. Cl.
*B62D 61/00* (2006.01)
(52) U.S. Cl. .................................. 180/209; 180/24.02
(58) Field of Classification Search .............. 180/209, 180/21, 24.02; 280/149.2, 5.52, 86.5
See application file for complete search history.

(56) References Cited

U.S. PATENT DOCUMENTS

| 3,369,624 | A | | 2/1968 | Kauffmann | |
|---|---|---|---|---|---|
| 4,204,697 | A | * | 5/1980 | Santerre | 280/149.2 |
| 5,346,233 | A | * | 9/1994 | Moser | 280/149.2 |
| 5,368,121 | A | * | 11/1994 | Priefert | 180/209 |
| 6,065,556 | A | * | 5/2000 | Andrews | 180/209 |
| 2004/0079561 | A1 | * | 4/2004 | Ozawa et al. | 180/21 |
| 2006/0254840 | A1 | * | 11/2006 | Strong | 180/190 |
| 2006/0254841 | A1 | * | 11/2006 | Strong | 180/190 |

FOREIGN PATENT DOCUMENTS

| FR | 2 694 240 A1 | 2/1994 |
|---|---|---|
| FR | 2 700 501 A1 | 7/1994 |
| JP | 59-149873 | 8/1984 |

* cited by examiner

*Primary Examiner*—Eric Culbreth
(74) *Attorney, Agent, or Firm*—Dickinson Wright PLLC

(57) ABSTRACT

A vehicle with an actively adjustable axle system suitable for traveling over even or uneven terrain with a load is herein proposed. The vehicle includes a frame having a front end, a rear end, and a fore-aft axis extending therebetween; a body mounted to the frame; an adjustable axle assembly mounted to the frame such that the adjustable axle assembly is aligned substantially orthogonal to the fore-aft axis; a pair of wheels rotatably mounted on the ends of the adjustable axle assembly such that the wheels are aligned substantially in parallel and are thereby capable of facilitating moving interaction with the ground; at least one supplemental ground-interacting apparatus mounted to the frame such that each supplemental ground-interacting apparatus cooperates with the pair of wheels to thereby maintain clearance between both the frame and the body and the ground; an actuation system capable of mechanically adjusting the adjustable axle assembly to thereby adjust the fore-aft position of the pair of wheels relative to both the frame and the body; and an electronic controller mounted to the body and electrically connected to the actuation system. In such a configuration, the electronic controller is capable of communicating electrical control signals to the actuation system to thereby adjust the fore-aft position of the pair of wheels as necessary to actively maintain the fore-aft stability of the vehicle.

7 Claims, 9 Drawing Sheets

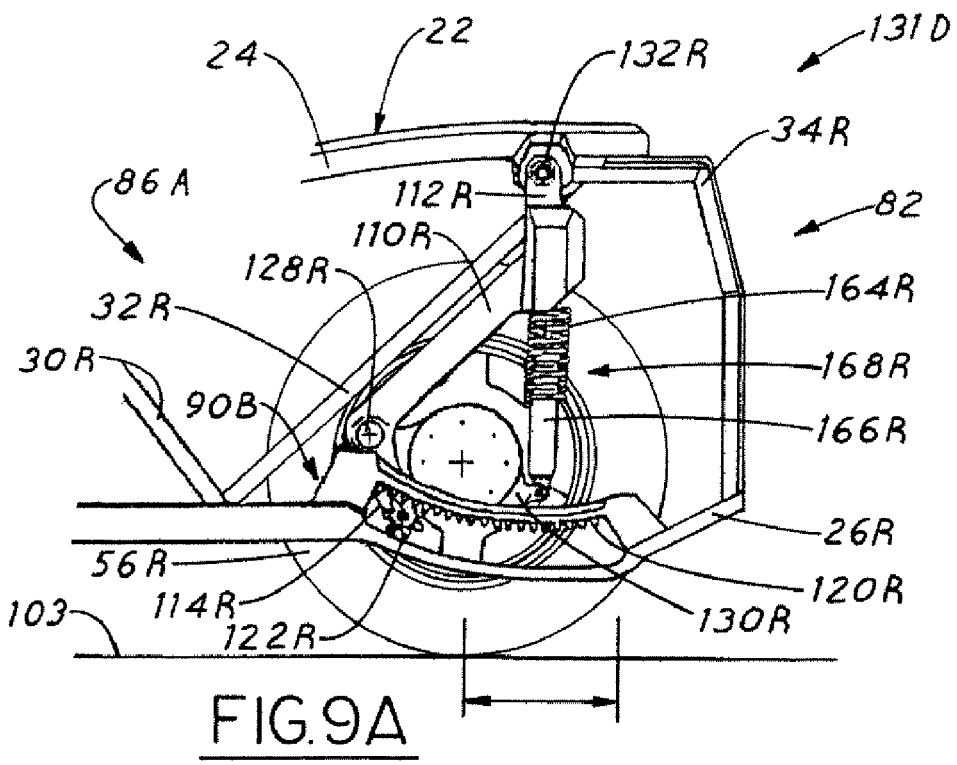
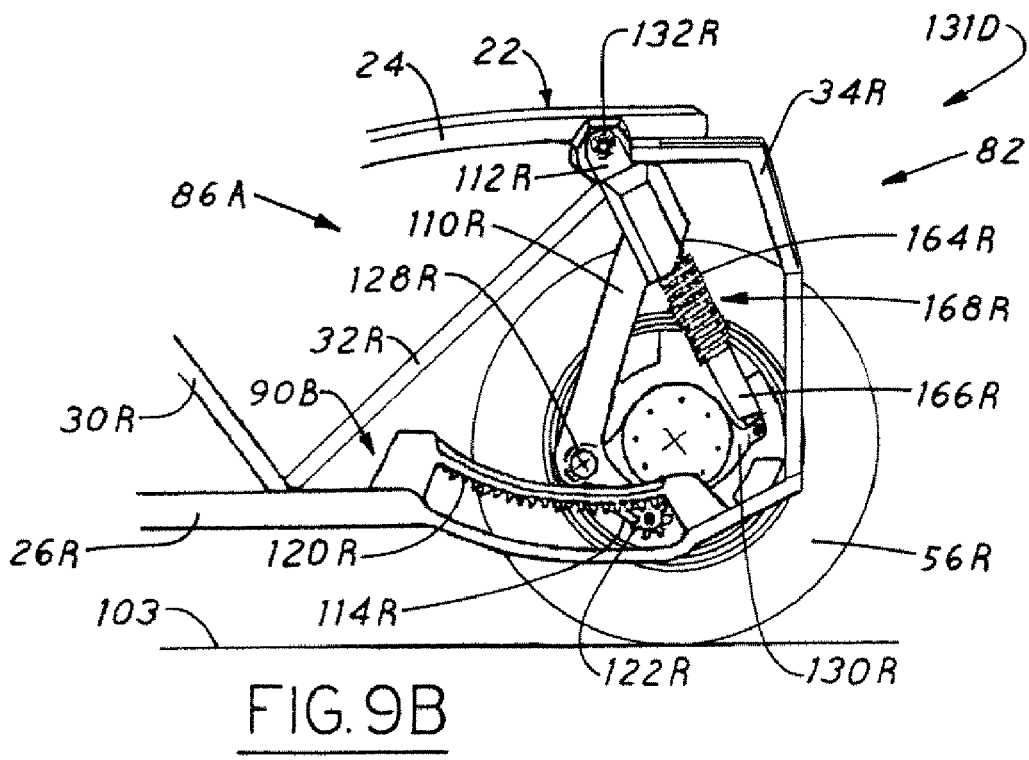

VEHICLE WITH ACTIVELY ADJUSTABLE AXLE SYSTEM

CROSS-REFERENCE TO RELATED APPLICATION

The present invention claims priority from U.S. Provisional Application Ser. No. 60/392,329, originally entitled "Moveable Axle for Vehicle Stability," which was filed on Jun. 28, 2002.

FIELD OF THE INVENTION

The present invention generally relates to road vehicles, off-road vehicles, or all-terrain vehicles (ATVs) suitable for traveling over even or uneven terrain. The present invention more particularly relates to vehicles having at least one axle assembly shared by two wheels suitable for use as, for example, automotive vehicles, recreational vehicles, agricultural vehicles, utility vehicles, construction vehicles, military vehicles, or robotic vehicles.

BACKGROUND OF THE INVENTION

A "zero turn" (ZT) vehicle, as is commonly known in the art, will in some embodiments typically include, for example, a frame, a power source, a body, a primary axle assembly, two drive wheels, and two dolly wheel assemblies. The power source is commonly mounted to the central or rear portion of the frame and typically includes, for example, at least one engine or motor. The body, too, is mounted to the frame and is suitable for carrying a human load, for example, the vehicle operator, and an object load as well. The primary axle assembly is also mounted to the frame. In particular, the primary axle assembly is typically mounted to the rear portion of the frame such that the primary axle assembly is aligned substantially orthogonal to the length of the frame. The two drive wheels, in turn, are rotatably mounted on the ends of the primary axle assembly such that the drive wheels are aligned substantially in parallel and are in mechanical communication with the power source. To facilitate ease in vehicle movement and travel, the two dolly wheel assemblies, lastly, are typically mounted to the front portion of the frame. In such a configuration, the two drive wheels are capable of facilitating both driving and moving interaction with the ground. The two dolly wheel assemblies, however, merely cooperate with the two drive wheels in generally maintaining the overall balance of the vehicle as the vehicle travels over the ground.

As is uniquely characteristic of a ZT vehicle, the two drive wheels are particularly rotatably mounted to the primary axle assembly so that they each have independent drive capability. That is, both the speed and the direction of rotation of the two drive wheels are controlled independently from each other as dictated by the vehicle operator through the delivery of power from the power source. In this way, steering the vehicle in a desired direction of travel is successfully accomplished by the vehicle operator through independently varying, as necessary, the rotational speed and direction of each drive wheel. As a result, a ZT vehicle is much more highly maneuverable as compared to automotive vehicles incorporating more traditional linkage or rack-and-pinion front axle steering systems. In particular, a ZT vehicle is virtually capable of "turning on a dime" and therefore has an overall vehicle turning radius of zero. The two ground-interacting dolly wheels associated with the two dolly wheel assemblies are each swivel mounted to the frame and rotatable such that they both merely cooperate with the two drive wheels in maintaining the overall balance of the vehicle as the vehicle travels over the ground. Thus, the two ground-interacting dolly wheels themselves are, by design, not capable of being directly steered by the vehicle operator.

Although a ZT vehicle has the inherent advantage and desirable characteristic of having such zero turn capability, a ZT vehicle also has some inherent disadvantages and undesirable characteristics as well. For example, if, as opposed to traveling directly up or directly down the side of a hill, a ZT vehicle is instead traveling across the side of a hill, the front portion of the vehicle naturally tends to pull the front end of the vehicle sideways and downhill. Such a tendency is due in respective part to three reasons. First, the typical ZT vehicle, as described hereinabove, is commonly weighted at its front end in order to maintain vehicle stability when driving up steep inclines. Second, the typical ZT vehicle, as described hereinabove, includes two ground-interacting dolly wheels mounted to the front portion of the frame that provide no directional stability for the front end of the vehicle. Third, since the "uphill" drive wheel of the vehicle naturally has less traction than the "downhill" drive wheel of the vehicle due to the incline of the hill effectively shifting more of the vehicle weight to the downhill drive wheel, the uphill drive wheel is prone to losing traction and therefore slipping. When such slipping occurs, the directional stability normally provided by the uphill drive wheel is lost, thereby causing the front end of the vehicle to be gravitationally pulled sideways and downhill.

To help correct the problem associated with traveling across a hillside, engineers commonly prescribe designs for ZT vehicles wherein most of the overall weight of the vehicle is shifted further back along the length of the frame. In doing so, most of the vehicle weight is thereby particularly centered just in front of and over the primary axle assembly. As a result, improved traction of the two drive wheels mounted on the ends of the primary axle assembly is realized and less pull at the front end of the vehicle is also realized whenever the vehicle travels across a hillside. However, a problem sometimes arises when the ZT vehicle attempts to travel directly up a steep hill. In particular, if the incline of a hill is sufficiently severe, the front end of the ZT vehicle comes off the ground as the overall weight and center of gravity of the vehicle shifts rearward and beyond the points of contact between the two drive wheels and the ground. Furthermore, even if the incline of a hill is not so severe, a sudden burst of acceleration by the ZT vehicle as initiated by a vehicle operator while driving the vehicle also frequently causes the front end of the vehicle to come off the ground. In extreme cases of these two types of situations, the front end of the ZT vehicle sometimes comes off the ground to the extent that the vehicle is altogether upended.

In order to remedy the problem associated with traveling directly up a steep hill, most designs for ZT vehicles include either a "wheelie bar" (sometimes simply called a "roller bar") or a skid plate. Such a wheelie bar or skid plate is mounted to the rear end of the vehicle frame to thereby prevent the vehicle from being altogether upended whenever the front end of the vehicle comes off the ground. The inclusion of one or both such remedial fixtures is reasonably effective in facilitating vehicle travel up a hill in cases where the front end of the vehicle infrequently and merely momentarily comes off the ground. However, such remedial fixtures have proven to be undesirable in cases where the front end of the vehicle comes off the ground for prolonged periods of time, for the fixtures in such cases give rise to drag that significantly inhibits rather than facilitates uphill travel.

To help eliminate the problems associated with traveling both across and up a hill, some engineers have designed ZT vehicles that include a manually adjustable ballast system. When used, such an adjustable ballast system has to, first of all, be manually preset. Once preset, the ballast system can then be effectively utilized onboard the vehicle, especially when traveling over long stretches of anticipated or known terrain with consistent topography or grade characteristics. However, such a manually adjustable ballast system has proven to be largely inconvenient to use when traveling over unanticipated or unknown terrain with extreme and ever-changing topography or grade characteristics. Furthermore, such a manually adjustable ballast system has also proven to be largely inconvenient to use whenever frequent and significant changes in the human load and/or the object load onboard the vehicle are made.

In an attempt to correct the problem associated with traveling over extreme and everchanging terrain, engineers have designed ZT vehicles that include two elongated ground-interacting track assemblies. The two track assemblies are mounted to the frame of the vehicle such that the two drive wheels, or drives associated therewith, are engaged within the two track assemblies to thereby facilitate both driving and moving interaction of the two track assemblies with the ground. In such a configuration, dolly wheel assemblies are typically not included. Although such elongated track assemblies are effective in improving the overall fore-aft stability of the vehicle when traveling over extreme and everchanging terrain, the inherent elongated nature of the track assemblies undesirably limits, in some situations, the zero turn capability of the vehicle. In addition, given the typical variation in fore-aft (i.e., front-to-back) loading of a ZT vehicle, each elongated track assembly often fails to properly interact with the ground in an even pressure-distributed manner along its respective length, thereby undesirably negating a characteristic advantage of utilizing such elongated track assemblies on terrain with, for example, sand or snow.

To remedy the problem associated with designing a ZT vehicle that successfully travels over extreme and everchanging terrain without limiting the zero turn capability of the vehicle, some engineers have designed a ZT vehicle that includes a gyroscopic sensor system. In particular, the vehicle includes a system of multiple gyroscopic sensors electrically connected to one or more electronic controllers. The electronic controllers, in turn, are electrically connected to drive wheel motors which themselves are in mechanical communication with the two drive wheels. In such a configuration, the gyroscopic sensors continuously sense the attitude or balance condition of the vehicle as the vehicle travels over everchanging terrain. While doing so, the gyroscopic sensors also continuously communicate electrical vehicle attitude or balance condition information signals to the electronic controllers. The electronic controllers, in turn, then process the electrical vehicle attitude information signals, generate electrical control signals based on the vehicle attitude information, and communicate the electrical control signals to the drive wheel motors. The drive wheel motors then mechanically operate the two drive wheels in compliance with the electrical control signals received from the electronic controllers. In this manner, the gyroscopic sensor system attempts to continuously maintain the fore-aft stability and overall balance of the vehicle by regulating the fore-aft driving rotation of the two drive wheels underneath the vehicle such that the overall weight and/or load of the vehicle is generally centered and maintained over the primary axle assembly and drive wheels. Although such a ZT vehicle with gyroscopic sensor system is reasonably effective in maintaining vehicle balance under most conditions, such is only marginally effective under conditions of reduced traction. For example, if an area of ground on a hillside is significantly covered with sand, loose gravel, mud, water, snow, or ice, a ZT vehicle with gyroscopic sensor system sometimes has difficulty in maintaining its balance while traveling thereon. Such difficulty is due to the fact that good traction necessary for drive wheel movement to quickly correct any vehicle imbalance is not always available under such reduced traction conditions.

In light of the above, there is a present need in the art for a vehicle and/or a vehicle system that (1) successfully maintains vehicle balance when traveling directly up a hill, (2) successfully maintains vehicle balance when traveling across a hillside, (3) successfully maintains vehicle balance even when a vehicle operator attempts rapid acceleration, (4) successfully maintains vehicle balance when traveling over terrain with extreme and everchanging topographies, (5) successfully maintains vehicle balance and optimizes traction even when there are significant and frequent changes in human load and/or object load onboard the vehicle, (6) successfully maintains vehicle balance even under reduced traction conditions, (7) does not unnecessarily limit maximum zero turn capability in a ZT vehicle, and (8) is successfully applicable to both ZT vehicles and non-ZT vehicles as well.

SUMMARY OF THE INVENTION

The present invention provides a vehicle with an actively adjustable axle system suitable for traveling over even or uneven terrain with a load. According to the present invention, the vehicle basically includes, first of all, a frame having a front end, a rear end, and a fore-aft axis extending therebetween. In addition, the vehicle also basically includes both a body and an adjustable axle assembly which are mounted to the frame. The body together with the frame may optionally be constructed such that both the body and the frame are substantially integral with each other within a substantially uni-body construction. The adjustable axle assembly, on the other hand, is mounted to the frame such that the adjustable axle assembly is aligned substantially orthogonal to the fore-aft axis associated with the frame. Moreover, the vehicle also basically includes a pair of wheels and one or more supplemental ground-interacting apparatuses. The wheels are rotatably mounted on the ends of the adjustable axle assembly such that the wheels are aligned substantially in parallel and are thereby capable of facilitating moving interaction with the ground. Each supplemental ground-interacting apparatus, on the other hand, is mounted to the frame such that each apparatus cooperates with the pair of wheels to thereby maintain clearance between both the frame and the body and the ground. Furthermore, the vehicle also basically includes an actuation system and an electronic controller. The actuation system is capable of mechanically adjusting the adjustable axle assembly to thereby adjust the fore-aft position of the pair of wheels relative to both the frame and the body. The electronic controller, on the other hand, is mounted to the body and electrically connected to the actuation system. In such a configuration, the electronic controller is capable of communicating electrical control signals to the actuation system to thereby adjust the fore-aft position of the pair of wheels as necessary to actively maintain the fore-aft stability of the vehicle. In general, such a vehicle according to the present invention may be adapted or suited for use as, for example, an automotive vehicle, a recreational vehicle, an agricultural vehicle, a utility vehicle, a construction vehicle, a military vehicle, or a robotic vehicle.

In a typical preferred embodiment according to the present invention, each supplemental ground-interacting apparatus is a rotatable wheel assembly. However, in other embodiments according to the present invention, each supplemental ground-interacting apparatus may instead be a ski runner, an anti-tip disc, a sliding disc, or other ground-interacting device. In such alternative embodiments, the vehicle preferably further includes a pair of ground-interacting track assemblies. Such ground-interacting track assemblies are preferably mounted to the adjustable axle assembly of the vehicle such that the pair of wheels, or any pair of drives associated therewith, is engaged within the pair of ground-interacting track assemblies to thereby facilitate moving interaction with the ground.

In a preferred embodiment according to the present invention, the vehicle may optionally further include an operator control panel. The operator control panel is capable of receiving operator preference input regarding the fore-aft position of the pair of wheels. Such an operator control panel is preferably mounted to the body of the vehicle and also electrically connected to the electronic controller. In such a configuration, the operator control panel is capable of communicating electrical operator preference input information signals to the electronic controller to thereby adjust the fore-aft position of the pair of wheels as necessary to actively maintain the fore-aft stability of the vehicle.

Also, in a preferred embodiment according to the present invention, the vehicle may optionally further include one or more attitude sensors. Each attitude sensor preferably includes gyroscope technology and is therefore capable of sensing the everchanging attitude of the vehicle as it travels over uneven terrain. Each such attitude sensor is preferably mounted to the frame of the vehicle and also electrically connected to the electronic controller. In such a configuration, each attitude sensor is capable of communicating electrical vehicle attitude information signals to the electronic controller to thereby adjust the fore-aft position of the pair of wheels as necessary to actively maintain the fore-aft stability of the vehicle. To ensure functional cooperation with each attitude sensor, the electronic controller itself preferably includes (1) means for processing the electrical vehicle attitude information signals communicated from each attitude sensor to thereby actively help determine the center of gravity of the vehicle as the vehicle travels over uneven terrain and (2) means for generating the electrical control signals according to the actively determined center of gravity to thereby prompt the actuation system to adjust the fore-aft position of the pair of wheels as necessary to actively maintain the fore-aft stability of the vehicle. Together, the electrical vehicle attitude information signals processing means and the electrical control signals generating means may be included on one or more electronic microprocessors associated with the electronic controller.

Moreover, in a preferred embodiment according to the present invention, the vehicle may optionally further include one or more load sensors. Each load sensor is capable of sensing the position and/or weight of the load onboard the vehicle. Each such load sensor is preferably mounted to the frame of the vehicle and also electrically connected to the electronic controller. In such a configuration, each load sensor is capable of communicating electrical load information signals to the electronic controller to thereby adjust the fore-aft position of the pair of wheels as necessary to actively maintain the fore-aft stability of the vehicle. To ensure functional cooperation with each load sensor, the electronic controller itself preferably includes (1) means for processing the electrical load information signals communicated from each load sensor to thereby actively help determine the center of gravity of the vehicle as the vehicle travels over uneven terrain and (2) means for generating the electrical control signals according to the actively determined center of gravity to thereby prompt the actuation system to adjust the fore-aft position of the pair of wheels as necessary to actively maintain the fore-aft stability of the vehicle. Together, the electrical load information signals processing means and the electrical control signals generating means may be included on one or more electronic microprocessors associated with the electronic controller.

Furthermore, in a preferred embodiment according to the present invention, the vehicle may optionally further include one or more position sensors. Each position sensor is capable of sensing the position of the adjustable axle assembly onboard the vehicle. Each such position sensor is preferably mounted to the frame of the vehicle and also electrically connected to the electronic controller. In such a configuration, each position sensor is capable of communicating electrical axle assembly position information signals to the electronic controller to thereby adjust the fore-aft position of the pair of wheels as necessary to actively maintain the fore-aft stability of the vehicle. To ensure functional cooperation with each position sensor, the electronic controller itself preferably includes (1) means for processing the electrical axle assembly position information signals communicated from each position sensor to thereby actively help determine the center of gravity of the vehicle as the vehicle travels over uneven terrain and (2) means for generating the electrical control signals according to the actively determined center of gravity to thereby prompt the actuation system to adjust the fore-aft position of the pair of wheels as necessary to actively maintain the fore-aft stability of the vehicle. Together, the electrical axle assembly position information signals processing means and the electrical control signals generating means may be included on one or more electronic microprocessors associated with the electronic controller.

In a preferred embodiment according to the present invention, the adjustable axle assembly itself may optionally include a cross arm assembly and a pair of swing arms. The swing arms preferably have pivotal ends pivotally mounted to the frame of the vehicle and distal ends interconnected with the cross arm assembly. Given such, the wheels of the vehicle are therefore preferably rotatably suspended from the swing arms proximate their distal ends. In cooperation with such an adjustable axle assembly, the actuation system itself may optionally include one or more cylinders such as, for example, telescoping cylinders. The cylinders are preferably connected between the frame of the vehicle and the pair of swing arms. In addition, the cylinders are also electrically connected to the electronic controller. In such a configuration, the electronic controller is capable of communicating the electrical control signals to the cylinders to thereby adjust the fore-aft position of the pair of wheels as necessary to actively maintain the fore-aft stability of the vehicle.

Also, in a preferred embodiment according to the present invention, the adjustable axle assembly itself may instead optionally include a cross arm assembly and a pair of slide arms. The slide arms are preferably slidingly engaged with the frame of the vehicle and are also interconnected with the cross arm assembly. Given such, the wheels of the vehicle are therefore preferably rotatably suspended from the slide arms. In cooperation with such an adjustable axle assembly, the actuation system itself may optionally include one or more cylinders such as, for example, telescoping cylinders. The cylinders are preferably connected between the frame of the vehicle and the pair of slide arms. In addition, the cylinders are also electrically connected to the electronic controller. In such a configuration, the electronic controller is capable of communicating the electrical control signals to the cylinders to thereby adjust the fore-aft position of the pair of wheels as necessary to actively maintain the fore-aft stability of the vehicle.

Moreover, in a preferred embodiment according to the present invention, the adjustable axle assembly itself may instead optionally include a cross arm assembly and a pair of swing arms. The swing arms preferably have pivotal ends pivotally mounted to the frame of the vehicle and distal ends interconnected with the cross arm assembly. Given such, the wheels of the vehicle are therefore preferably rotatably suspended from the swing arms proximate their distal ends. In cooperation with such an adjustable axle assembly, the actuation system itself may optionally include a pair of racks, a pair of pinion gears, and an electric motor. The two racks are preferably fixed to the frame of the vehicle, and the two pinion gears are preferably rotatably mounted to the distal ends of the pair of swing arms such that the two pinion gears are engaged with the two racks. The electric motor is electrically connected to the electronic controller and is capable of mechanically dictating concomitant rotation of the two pinion gears and thereby movement of the two pinion gears along the two racks. In such a configuration, the electronic controller is capable of communicating the electrical control signals to the electric motor to thereby adjust the fore-aft position of the pair of wheels as necessary to actively maintain the fore-aft stability of the vehicle.

Furthermore, in an ultimate preferred embodiment according to the present invention, both the basic features and the optional features described hereinabove are, for the most part, included together within the same vehicle. In such an ultimate preferred embodiment, the vehicle (1) successfully maintains its balance when traveling directly up a hill, (2) successfully maintains its balance when traveling across a hillside, (3) successfully maintains its balance even when a vehicle operator attempts rapid acceleration, (4) successfully maintains its balance when traveling over terrain with extreme and ever-changing topographies, (5) successfully maintains its balance and optimizes traction even when there are significant and frequent changes in human load and/or object load onboard, (6) successfully maintains its balance even under reduced traction conditions, (7) is not unnecessarily limited in maximum zero turn capability when suited for use as a zero turn (ZT) vehicle, and (8) may successfully be adapted or suited for use as either a ZT vehicle or a non-ZT vehicle.

Advantages, design considerations, and applications of the present invention will become apparent to those skilled in the art when the detailed descriptions of the best modes contemplated for practicing the invention, as set forth hereinbelow, are read in conjunction with the accompanying drawings.

BRIEF DESCRIPTION OF THE DRAWINGS

The present invention will be described, by way of example, with reference to the following drawings.

FIG. 9A is a cut-away side view of a rack-and-pinion actuation system engaged with an adjustable swing arm axle assembly included in still another alternative embodiment of the vehicle according to the present invention, wherein the two rear drive wheels of the vehicle are in a fully retracted (forward) fore-aft position.

FIG. 9B is a cut-away side view of the rack-and-pinion actuation system engaged with the adjustable swing arm axle assembly depicted in FIG. 9A, wherein the two rear drive wheels of the vehicle are alternatively in a fully extended (rearward) fore-aft position.

DETAILED DESCRIPTIONS OF THE PREFERRED EMBODIMENTS

Figure 1A:
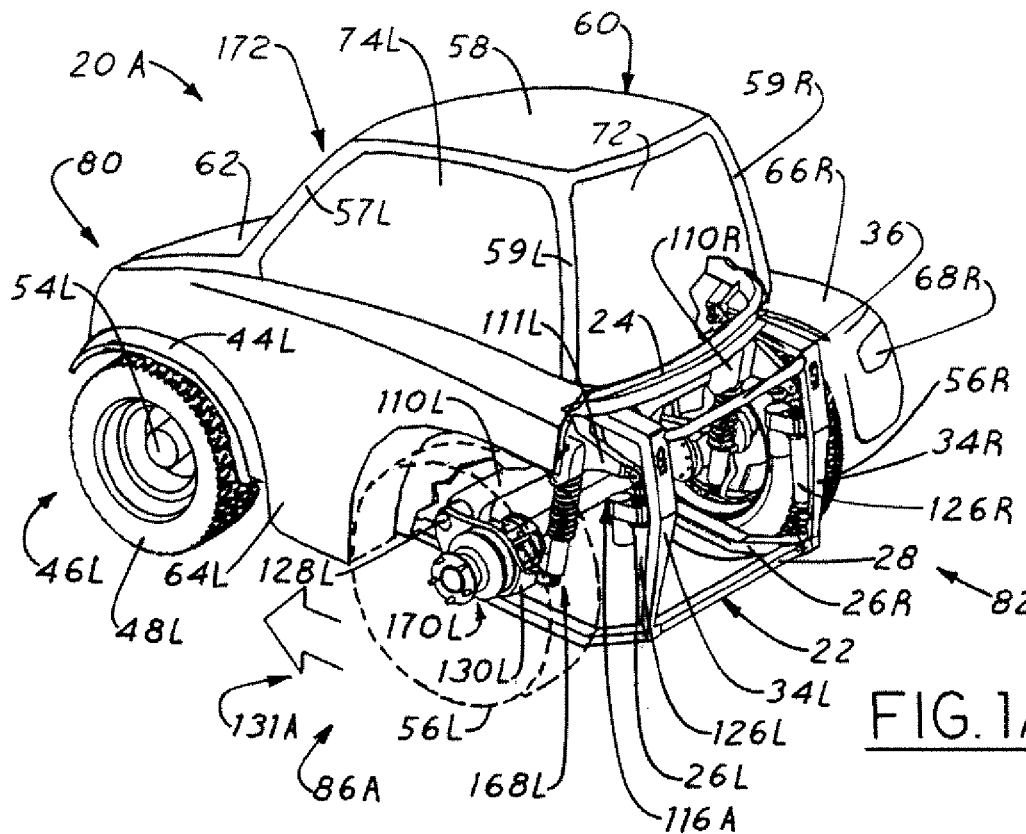
FIG. 1A is a rear perspective view of a first embodiment of the vehicle according to the present invention, wherein the vehicle includes a telescoping cylinder actuation system engaged with an adjustable swing arm axle assembly such that the two rear drive wheels of the vehicle are in a fully retracted (forward) fore-aft position.
Figure 1B:
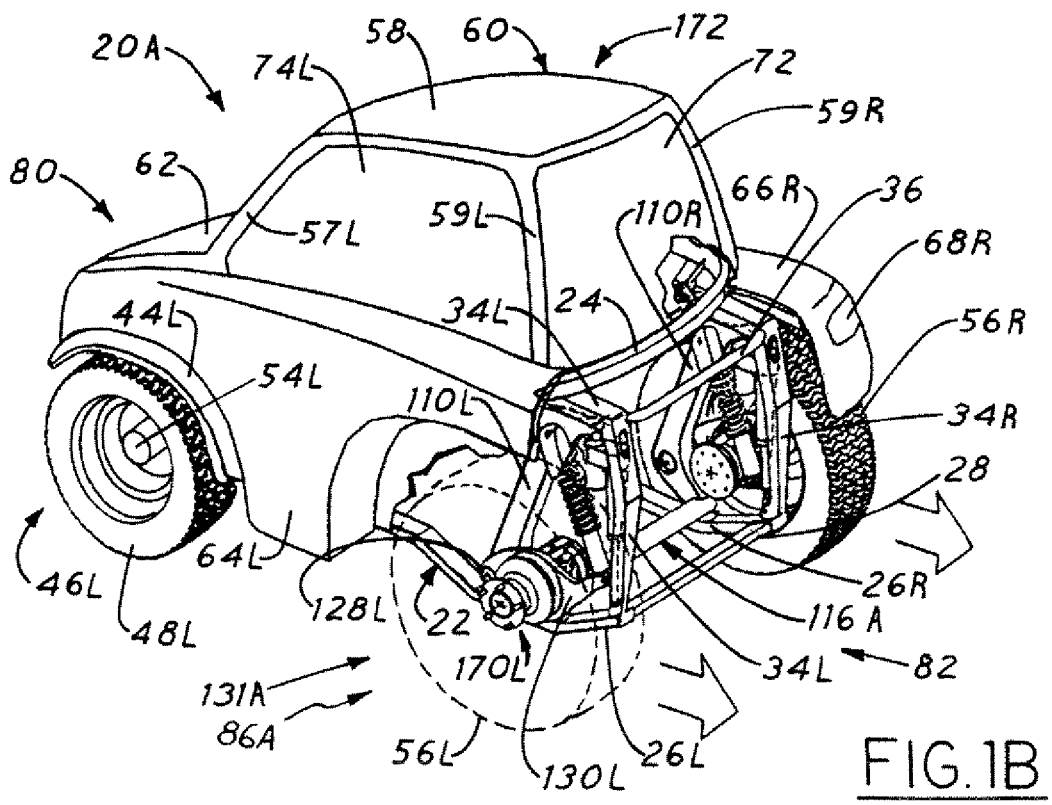
FIG. 1B is a rear perspective view of the vehicle depicted in FIG. 1A, wherein the telescoping cylinder actuation system is alternatively engaged with the adjustable swing arm axle assembly such that the two rear drive wheels of the vehicle are in a fully extended (rearward) fore-aft position.
Figure 2A:
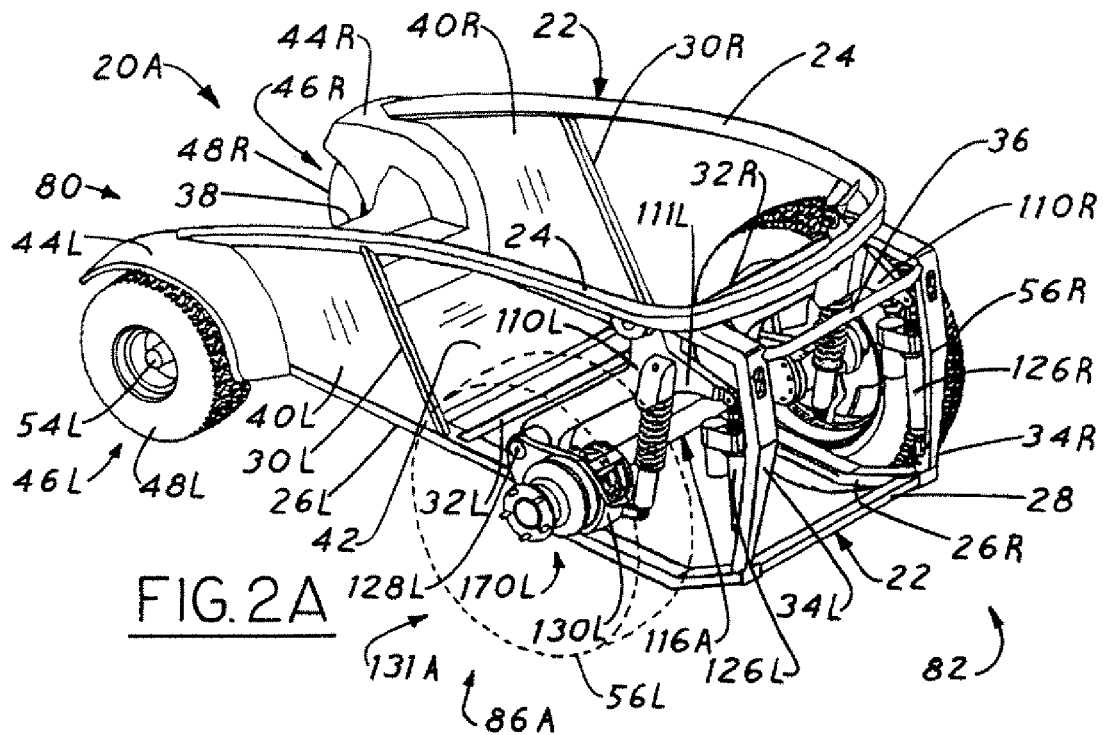
FIG. 2A is a rear perspective view of the vehicle depicted in FIG. 1A, wherein the frame of the vehicle is particularly highlighted and the telescoping cylinder actuation system is engaged with the adjustable swing arm axle assembly such that the two rear drive wheels of the vehicle are in a fully retracted (forward) fore-aft position.
Figure 2B:
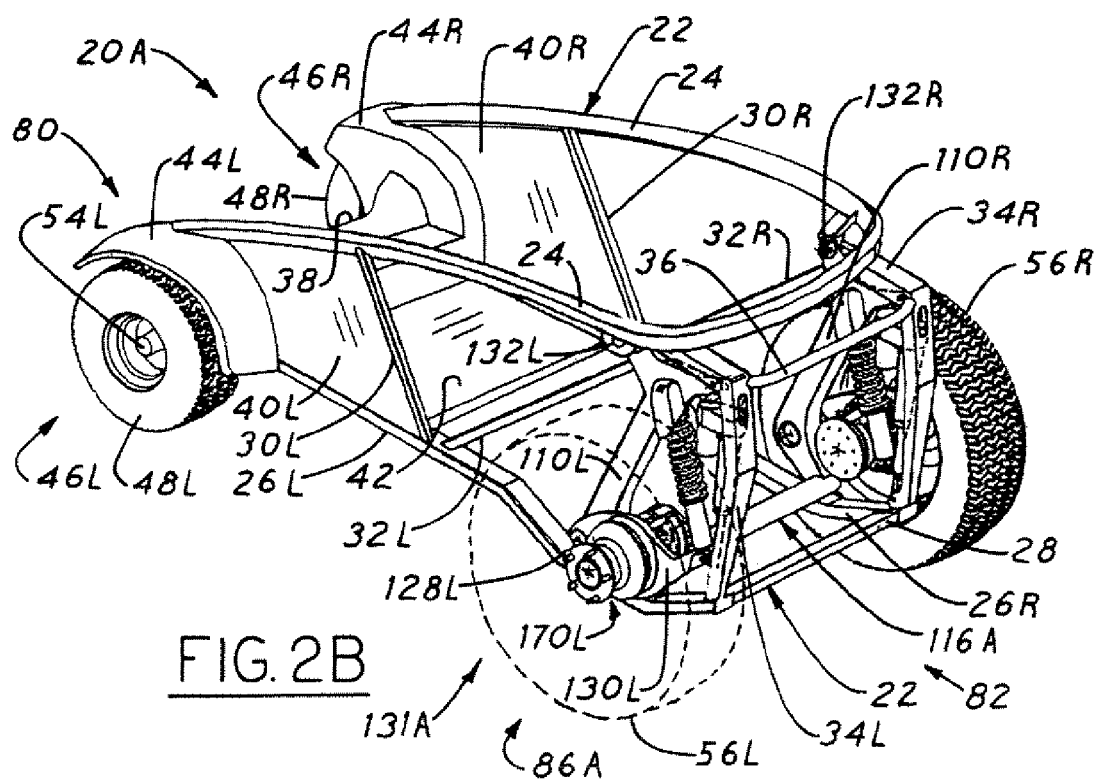
FIG. 2B is a rear perspective view of the vehicle depicted in FIG. 2A, wherein the frame of the vehicle is particularly highlighted and the telescoping cylinder actuation system is alternatively engaged with the adjustable swing arm axle assembly such that the two rear drive wheels of the vehicle are in a fully extended (rearward) fore-aft position.

As illustrated in FIGS. 1A through 12, the present invention generally provides a vehicle 20 with an actively adjustable axle system 131 situated onboard. The vehicle 20 is suitable for traveling over even or uneven terrain with a load. The actively adjustable axle system 131A itself generally includes an adjustable axle assembly 86, an actuation system 90A, and an electronic controller 96. The electronic controller 96 is capable of communicating electrical control signals to the actuation system 90. The actuation system 90, in turn, is capable of mechanically adjusting the adjustable axle assembly 86 to thereby adjust the fore-aft position of any pair of wheels rotatably mounted on the ends of the adjustable axle assembly 86. In sum, therefore, the electronic controller 96 is capable of communicating electrical control signals to the actuation system 90 to thereby adjust the fore-aft position of the pair of wheels as necessary to actively maintain the overall balance, and particularly the fore-aft stability, of the vehicle 20 as the vehicle 20 travels over various types of terrain, especially uneven terrain. In general, such a vehicle 20 according to the present invention may be adapted or suited for use as, for example, an automotive vehicle, a recreational vehicle, an agricultural vehicle, a utility vehicle, a construction vehicle, a military vehicle, or a robotic vehicle. Detailed descriptions of preferred embodiments of the vehicle 20 according to the present invention are set forth hereinbelow wherein both the structures and operations of the preferred embodiments are discussed.

First Embodiment

FIGS. 1A through 6B illustrate a first embodiment 20A of the vehicle 20 according to the present invention. The vehicle 20A is a zero turn (ZT) vehicle that includes, as particularly illustrated in FIG. 3, a frame 22 having an associated front end 80, a rear end 82, and a fore-aft axis 84 extending therebetween. The frame 22 itself includes a plurality of support members 24, 26L, 26R, 28, 30L, 30R, 32L, 32R, 34L, 34R, 36, and 38 and also a plurality of support panels 40L, 40R, and 42 assembled together as particularly illustrated in FIGS. 2A, 2B, 3, 5, 6A, and 6B. It is to be understood, however, that such support members and support panels may alternatively be formed as an integral whole. In addition to the frame 22, the vehicle 20A also includes a body 60 that is mounted to the frame 22. The body 60 itself optionally includes a roof panel 58, left and right front roof panel support members (only the left front roof panel support member 57L is shown), left and right rear roof panel support members 59L and 59R, a front hood panel 62, left and right side panels (only the left side panel 64L is shown), a rear panel 76, left and right front fenders 44L and 44R, and left and right rear fenders 66L and 66R assembled together as particularly illustrated in FIGS. 1A and 1B. Given such an assemblage of parts, a front window 70, left and right side windows (only the left side window 74L is shown), a rear window 72, left and right head lights (not shown), and left and right tail lights 68L and 68R are successfully accommodated and incorporated within the vehicle 20A as well. Notwithstanding such a first embodiment 20A wherein the frame 22 and the body 60 are constructed separately before being mounted together, it is to be understood that the body 60 and the frame 22 may alternatively be constructed such that they are substantially integral with each other within a substantially "unitized" or "unibody" construction.

Figure 3:
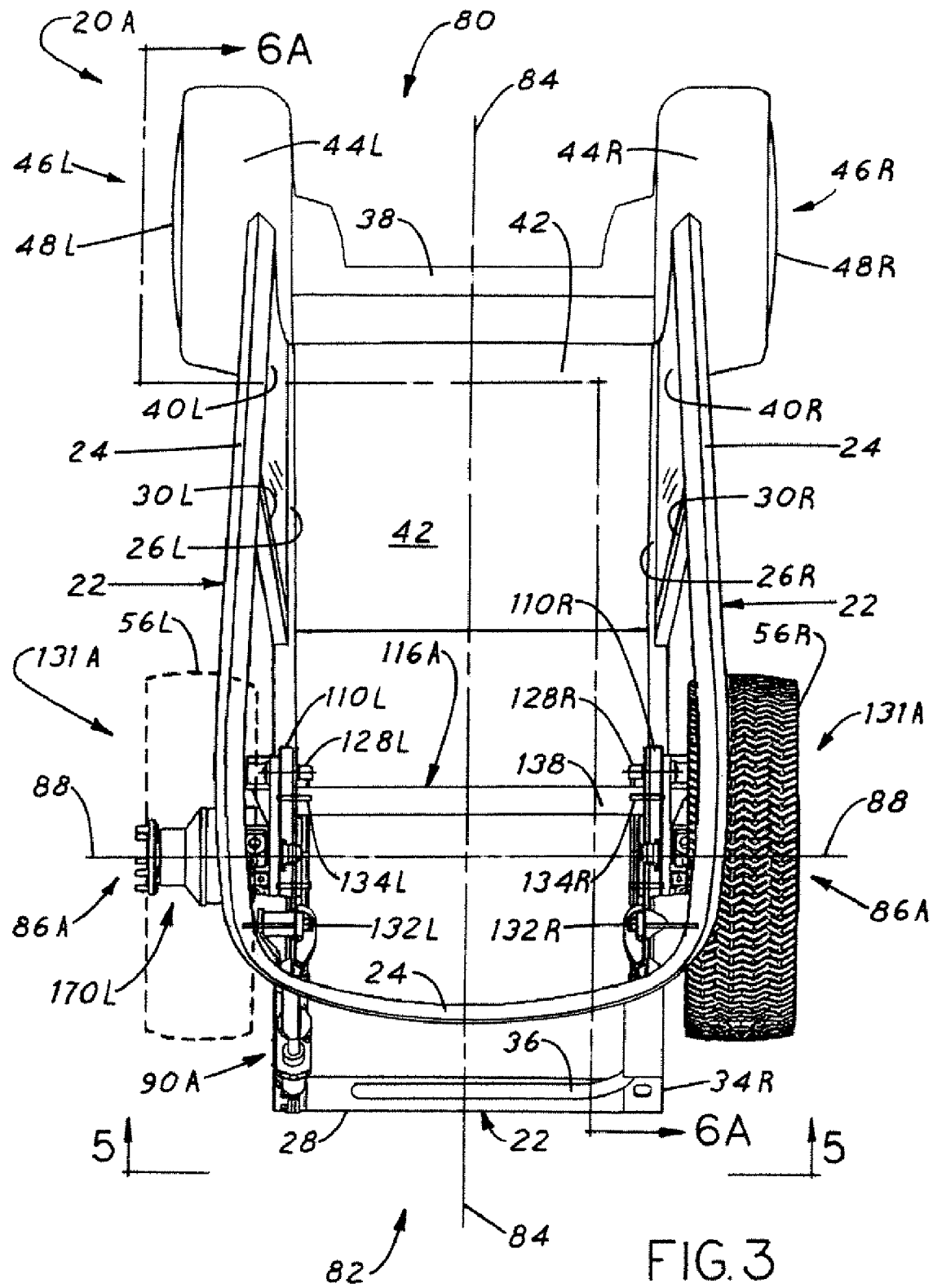
FIG. 3 is a top view of the vehicle depicted in FIG. 2A, wherein the frame of the vehicle is particularly highlighted and the telescoping cylinder actuation system is engaged with the adjustable swing arm axle assembly such that the two rear drive wheels of the vehicle are in a fully retracted (forward) fore-aft position.

In addition to both the frame 22 and the body 60, the vehicle 20A also includes a first embodiment 131A of the actively adjustable axle system 131A with a pair of rear drive wheels 56L and 56R. The actively adjustable axle system 131A itself includes a first embodiment 86A of the adjustable axle assembly 86, a first embodiment 90A of the actuation system 90, and the electronic controller 96. The adjustable axle assembly 86A, as particularly illustrated in FIG. 3, is mounted to the rear portion of the frame 22 such that an adjustable axle assembly axis 88 associated with the adjustable axle assembly 86A is aligned substantially orthogonal to the fore-aft axis 84 associated with the frame 22. The adjustable axle assembly 86A itself includes a first embodiment 116A of a cross arm assembly and also a pair of swing arms 110L and 110R. The cross arm assembly 116A, first of all, includes a single cross arm 138. As particularly illustrated in FIGS. 6A and 6B, the swing arms 110L and 110R, in turn, respectively have pivotal ends (only the right pivotal end 112R is identified) pivotally mounted at pivot points 132L and 132R to the frame 22 of the vehicle 20A. In addition, the swing arms 110L and 110R also have distal ends and 114R interconnected with the cross arm 138 at attachment points 134L and 134R.

Given the adjustable axle assembly 86A as configured, the two rear drive wheels 56L and 56R are rotatably suspended from the two swing arms 110L and 110R proximate the distal ends 114L and 114R thereof. As particularly illustrated in FIGS. 1A, 1B, 2A, 2B, 6A, and 6B, suspension of the pair of rear drive wheels 56L and 56R from the pair of swing arms 110L and 110R is particularly achieved with both a pair of suspension arms 130L and 130R and also a pair of strut assemblies (only the right strut assembly 168R is identified). The suspension arms 130L and 130R themselves have, first of all, first ends pivotally fastened at pivot points 128L and 128R to the swing arms 110L and 110R proximate the distal ends 114L and 114R thereof. In addition, the suspension arms 130L and 130R also have second ends indirectly connected to the swings arms 110L and 110R proximate the pivotal ends thereof via the strut assemblies. The two strut assemblies themselves, in turn, respectively include coil springs (only the right coil spring 164R is identified) and also shock absorbers or dampers (only the right shock absorber 166R is identified). Given such a suspension configuration, the two rear drive wheels 56L and 56R themselves are particularly rotatably mounted to the middle sections of the two suspension arms 130L and 130R by means of a pair of hub-and-bearing assemblies (only the left assembly 170L is identified) as particularly illustrated in FIGS. 1A through 3 and 5 through 6B. In this way, the two rear drive wheels 56L and 56R are thereby ultimately rotatably mounted on the ends of the adjustable axle assembly 86A such that the two rear drive wheels 56L and 56R are aligned substantially in parallel and are in mechanical, hydraulic, and/or electrical communication with a power source (not shown) mounted to the frame 22. The power source itself may include, for example, at least one engine or motor. As a result of being in such communication with the power source, the two rear drive wheels 56L and 56R of the vehicle 20A are thereby capable of facilitating both moving and independent driving interaction with the ground 103.

To facilitate adjustment of the adjustable axle assembly 86A, the actuation system 90A includes a pair of telescoping cylinders 126L and 126R serving as left and right actuators. As particularly illustrated in FIGS. 6A and 6B, the two telescoping cylinders 126L and 126R are preferably connected between the frame 22 of the vehicle 20A and projections 111L and 111R integral with the pivotal ends of the two swing arms 110L and 110R. In addition, as particularly illustrated in FIG. 4, the two telescoping cylinders 126L and 126R (i.e., actuators) are also electrically connected to the electronic controller 96 which itself is mounted to and/or within the body 60. In such a configuration, the electronic controller 96 is particularly capable of communicating electrical control signals to the two telescoping cylinders 126L and 126R to thereby adjust the fore-aft position of the pair of rear drive wheels 56L and 56R as necessary to actively maintain the fore-aft stability of the vehicle 20A.

In addition to the frame 22, the body 60, the actively adjustable axle system 131A, and the two rear drive wheels 56L and 56R, the vehicle 20A further includes a pair of dolly wheel assemblies 46L and 46R. The dolly wheel assemblies 46L and 46R are mounted to the front portion of the frame 22 such that they cooperate with the two rear drive wheels 56L and 56R in generally maintaining the overall balance of the vehicle 20A as the vehicle 20A travels over the ground 103. As particularly illustrated in FIGS. 2A, 2B, 3, 6A, and 6B, the pair of dolly wheel assemblies 46L and 46R itself includes a pair of ground-interacting dolly wheels 48L and 48R, a matching pair of spindles (only the left spindle 54L is shown), a matching pair of swivel arms (only the left arm 52L is shown), and a matching pair of swivel joints (only the left joint 50L is shown). The two dolly wheels 48L and 48R are rotatably mounted on the two spindles. The two spindles, in turn, are connected to the two swivel arms. The two swivel arms are swivel mounted to the frame 22 by the two swivel joints respectively situated underneath the two front fenders 44L and 44R. Given such a configuration, the two dolly wheel assemblies 46L and 46R thereby serve as two supplemental ground-interacting apparatuses which cooperate with the two rear drive wheels 56L and 56R to thereby maintain clearance between both the frame 22 and the body 60 and the ground 103. The two ground-interacting dolly wheels 48L and 48R are, by design in this particular embodiment, not capable of being directly steered by a vehicle operator onboard the vehicle 20A. It is to be understood, however, that the two dolly wheels 48L and 48R may optionally be equipped to power rotate in sync or in coordination with the moving speed of the two rear drive wheels 56L and 56R.

Figure 4:
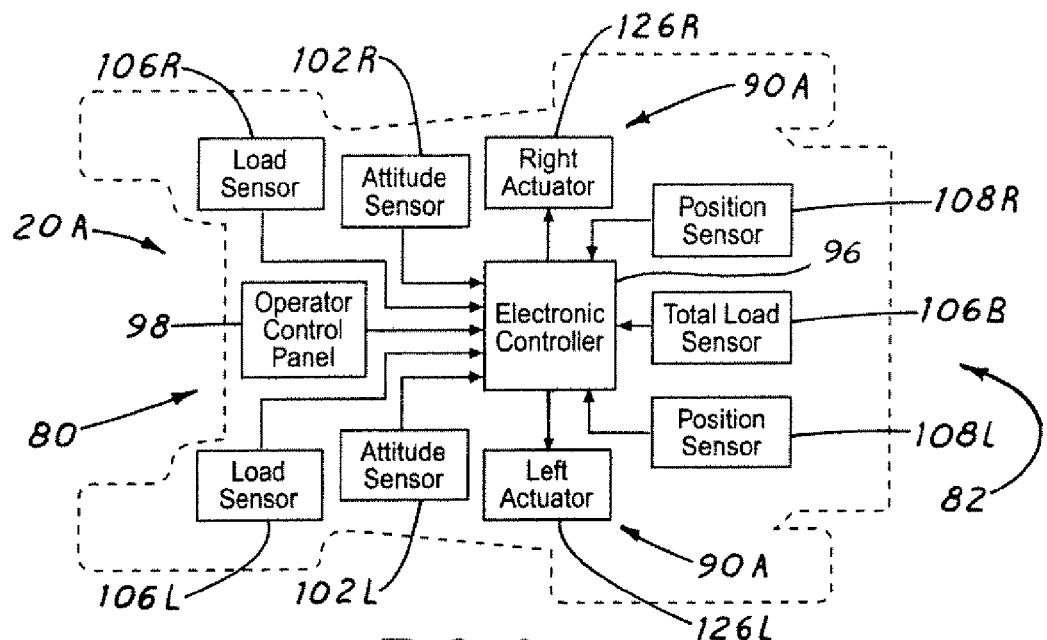
FIG. 4 is a block diagram illustrating how electrical information signals are communicated to an electronic controller onboard the vehicle and how electrical control signals are communicated from the electronic controller to the actuation system.
Figure 5:
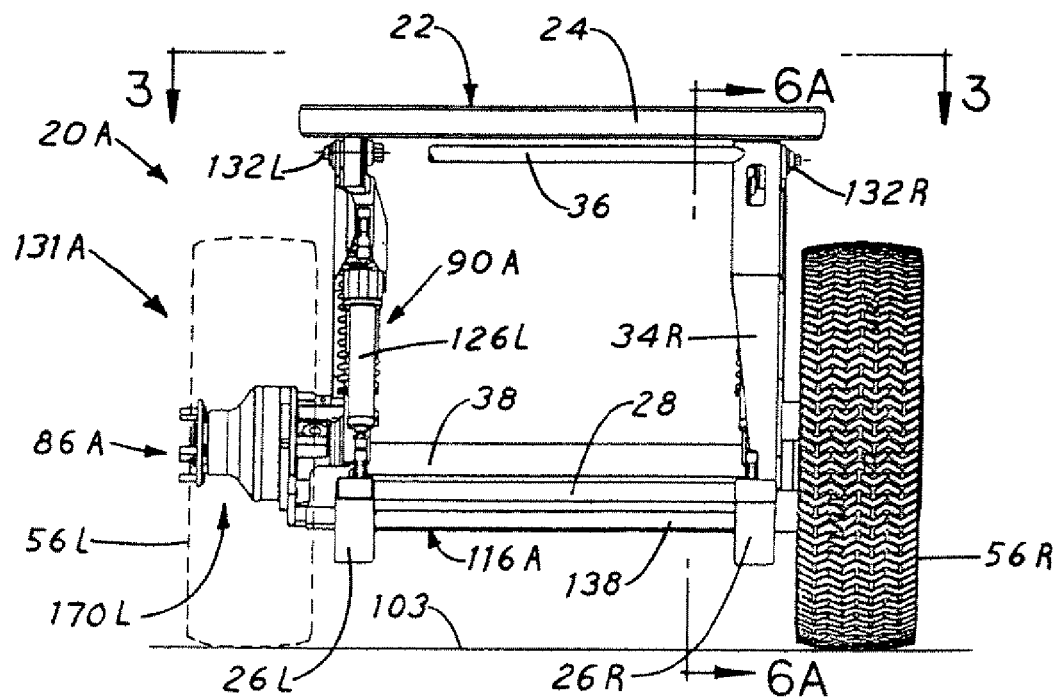
FIG. 5 is a rear view of the vehicle depicted in FIGS. 2A and 3, wherein the frame of the vehicle is particularly highlighted and the telescoping cylinder actuation system is engaged with the adjustable swing arm axle assembly such that the two rear drive wheels of the vehicle are in a fully retracted (forward) fore-aft position.

As illustrated in FIG. 4, the vehicle 20A also includes an operator control panel 98 situated onboard. The operator control panel 98 is capable of receiving operator preference input from a vehicle operator, for example, a human driver, regarding the fore-aft position of the pair of rear drive wheels 56L and 56R. Such an operator control panel 98 is preferably mounted within and/or to the body 60 of the vehicle 20A within a vehicle operator cabin 172 or proximate to a designated vehicle operator position. In addition, the operator control panel 98 is also electrically connected to the electronic controller 96. In such a configuration, the operator control panel 98 is capable of communicating electrical operator preference input information signals to the electronic controller 96 to thereby adjust the fore-aft position of the pair of rear drive wheels 56L and 56R as necessary, or as desired by the vehicle operator, to actively maintain the fore-aft stability of the vehicle 20A.

Also, as illustrated in FIG. 4, the vehicle 20A additionally includes a pair of attitude sensors 102L and 102R. Each attitude sensor 102L and 102R preferably includes conventional gyroscope technology and is therefore capable of sensing the everchanging attitude of the vehicle 20A as it travels across the ground 103 and over uneven terrain 104. Each attitude sensor 102L and 102R is preferably mounted to the frame 22 of the vehicle 20A and is electrically connected to the electronic controller 96. In such a configuration, the two attitude sensors 102L and 102R are capable of communicating electrical vehicle attitude information signals to the electronic controller 96 to thereby adjust the fore-aft position of the pair of rear drive wheels 56L and 56R as necessary to actively maintain the fore-aft stability of the vehicle 20A. To ensure functional cooperation with the two attitude sensors 102L and 102R, the electronic controller 96 includes, first of all, means for processing the electrical vehicle attitude information signals communicated from each attitude sensor 102L and 102R to thereby actively help determine the center of gravity 100 of the vehicle 20A with its cumulative onboard load as the vehicle 20A travels over uneven terrain 104. In addition, the electronic controller 96 also includes means for generating the electrical control signals according to the actively determined center of gravity 100 to thereby prompt the actuation system 90A to adjust the fore-aft position of the pair of rear drive wheels 56L and 56R as necessary to actively maintain the fore-aft stability of the vehicle 20A. Together, the electrical vehicle attitude information signals processing means and the electrical control signals generating means may be included on one or more electronic microprocessors associated with the electronic controller 96.

As particularly suggested in FIG. 4, the two attitude sensors 102L and 102R are preferably mounted to the frame 22 of the vehicle 20A on opposite sides of the vehicle 20A. In this way, the two attitude sensors 102L and 102R are capable of directly sensing the attitude of the vehicle 20A as the vehicle 20A travels over uneven terrain 104 and particularly uphill. Although having a single attitude sensor mounted to the frame 22 would generally suffice, having the two attitude sensors 102L and 102R situated on opposite sides of the vehicle 20A facilitates both cross-checking by the electronic controller 96 of the vehicle attitude information provided by the two attitude sensors 102L and 102R and also the taking into account of any flexing, twisting, or torsion of the frame 22 as the vehicle 20A travels over uneven terrain 104. Notwithstanding such an attitude sensor configuration, it is to be understood that many different attitude sensor positioning schemes on the frame or within the body of a vehicle pursuant to the present invention may alternatively be adopted.

Moreover, as illustrated in FIG. 4, the vehicle 20A further includes a plurality of load sensors 106L, 106R, and 106B. Each load sensor 106L, 106R, and 106B is capable of conventionally sensing a particular aspect of the cumulative load onboard the vehicle 20A such as, for example, the position and/or weight of the smaller, onboard individual loads that comprise the cumulative load. Such individual loads onboard the vehicle 20A may include, for example, a human load (i.e., the vehicle operator) in addition to any object load, for example, luggage, tools, equipment, and/or weapons. Given such, the load sensors in FIG. 4 particularly include, first of all, a left load sensor 106L and a right load sensor 106R situated at opposite corners of the front end 80 of the vehicle 20A. In addition, a total load sensor 106B is particularly included and situated proximate the axis 88 associated with the adjustable axle assembly 86A at the back end 82 of the vehicle 20A. Each such load sensor 106L, 106R, and 106B is preferably mounted to the frame 22 of the vehicle 20A and is electrically connected to the electronic controller 96. In such a configuration, each load sensor 106L, 106R, and 106B is capable of communicating electrical load information signals to the electronic controller 96 to thereby adjust the fore-aft position of the pair of rear drive wheels 56L and 56R as necessary to actively maintain the fore-aft stability of the vehicle 20A. To ensure functional cooperation with each load sensor 106L, 106R, and 106B, the electronic controller 96 includes, first of all, means for processing the electrical load information signals communicated from each load sensor 106L, 106R, and 106B to thereby actively help determine the center of gravity 100 of the vehicle 20A with its cumulative onboard load as the vehicle 20A travels over uneven terrain 104. In addition, the electronic controller 96 also includes means for generating the electrical control signals according to the actively determined center of gravity 100 to thereby prompt the actuation system 90A to adjust the fore-aft position of the pair of rear drive wheels 56L and 56R as necessary to actively maintain the fore-aft stability of the vehicle 20A. Together, the electrical load information signals processing means and the electrical control signals generating means may be included on one or more electronic microprocessors associated with the electronic controller 96.

Furthermore, as illustrated in FIG. 4, the vehicle 20A still further includes a pair of position sensors 108L and 108R. Each position sensor 108L and 108R is capable of conventionally sensing the position of the adjustable axle assembly 86A onboard the vehicle 20A. Each position sensor 108L and 108R is preferably mounted to the frame 22 of the vehicle 20A such that each position sensor 108L and 108R is situated proximate to the axis 88 associated with the adjustable axle assembly 86A. In addition, each position sensor 108L and 108R is also electrically connected to the electronic controller 96. In such a configuration, each position sensor 108L and 108R is capable of communicating electrical axle assembly position information signals to the electronic controller 96 to thereby adjust the fore-aft position of the pair of rear drive wheels 56L and 56R as necessary to actively maintain the fore-aft stability of the vehicle 20A. To ensure functional cooperation with each position sensor 108L and 108R, the electronic controller 96 includes, first of all, means for processing the electrical axle assembly position information signals communicated from each position sensor 108L and 108R to thereby actively help determine the center of gravity 100 of the vehicle 20A with its cumulative onboard load as the vehicle 20A travels over uneven terrain 104. In addition, the electronic controller 96 also includes means for generating the electrical control signals according to the actively determined center of gravity 100 to thereby prompt the actuation system 90A to adjust the fore-aft position of the pair of rear drive wheels 56L and 56R as necessary to actively maintain the fore-aft stability of the vehicle 20A. Together, the electrical axle assembly position information signals processing means and the electrical control signals generating means may be included on one or more electronic microprocessors associated with the electronic controller 96.

During operation, as the vehicle 20A travels over the ground 103, the electronic controller 96 receives electrical vehicle attitude information signals from the attitude sensors 102L and 102R, electrical load information signals from the load sensors 106L, 106R, and 106B, and electrical axle assembly position information signals from the position sensors 108L and 108R on a substantially continuous basis. As all of these electrical information signals are received, the electronic controller 96 promptly processes the electrical information signals. In doing so, the electronic controller 96 thereby attempts to actively determine and monitor the position of the center of gravity 100 of the vehicle 20A together with its cumulative onboard load in relation to the ground contact points of both the two dolly wheels 48L and 48R and also the two rear drive wheels 56L and 56R.

Figure 6A:
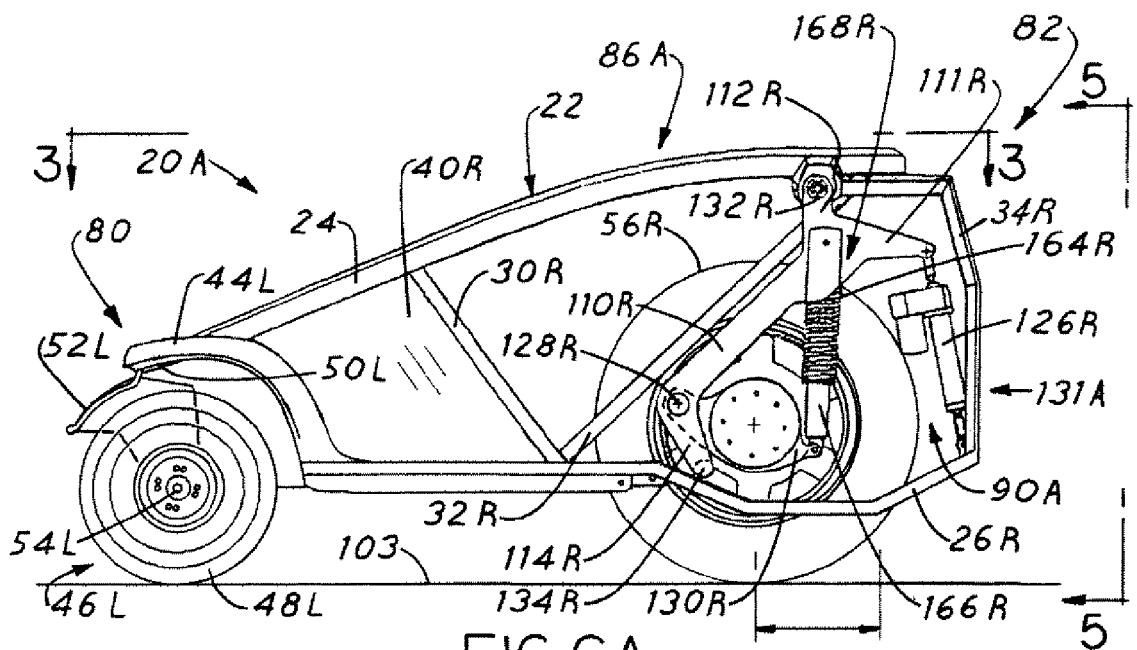
FIG. 6A is a partial cut-away side view of the vehicle depicted in FIGS. 2A, 3, and 5, wherein the frame of the vehicle is particularly highlighted and the telescoping cylinder actuation system is engaged with the adjustable swing arm axle assembly such that the two rear drive wheels of the vehicle are in a fully retracted (forward) fore-aft position.
Figure 6B:
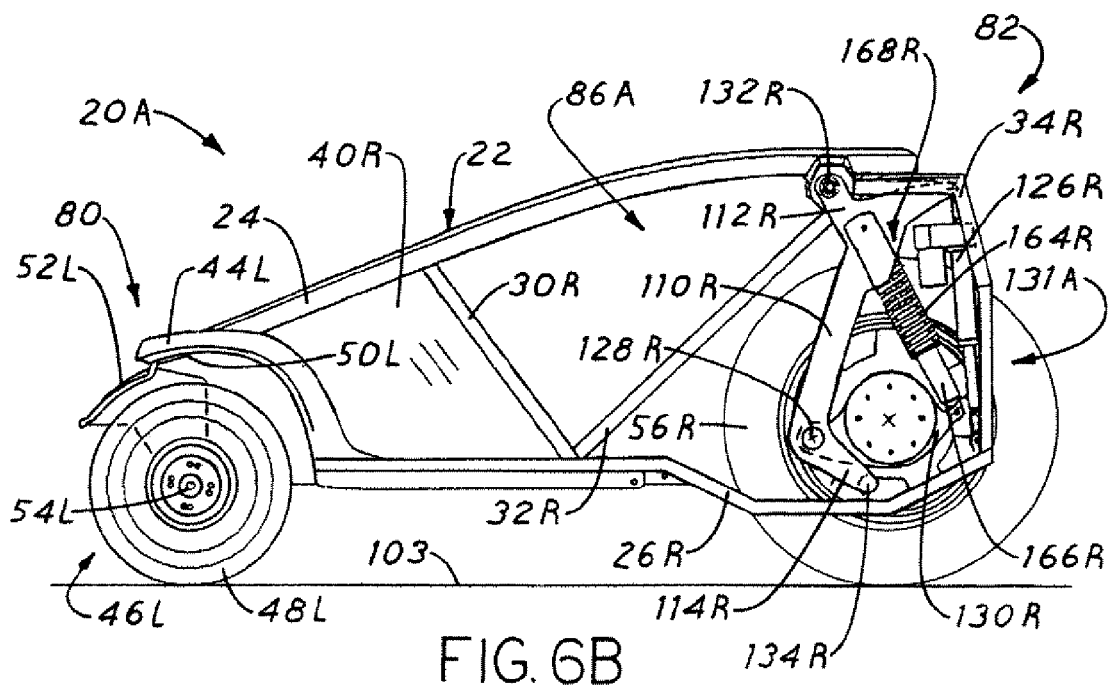
FIG. 6B is a partial cut-away side view of the vehicle depicted in FIG. 6A, wherein the frame of the vehicle is particularly highlighted and the telescoping cylinder actuation system is alternatively engaged with the adjustable swing arm axle assembly such that the two rear drive wheels of the vehicle are in a fully extended (rearward) fore-aft position.

Given that the vehicle 20A in this particular embodiment is a ZT vehicle, the vehicle 20A and its component parts are specifically dimensioned, weighted, and assembled such that the overall center of gravity 100 of the vehicle 20A together with its load is naturally predisposed to being well behind the ground contact points of the dolly wheels 48L and 48R and just in front of and over the ground contact points of the two rear drive wheels 56L and 56R when the two rear drive wheels 56L and 56R are in a position forward of the midpoint of the adjustable axle assembly movement range and the vehicle 20A is traveling over ground 103 that is substantially level. In light of such purposeful dimensioning and center of gravity predispositioning, when the vehicle 20A is traveling over substantially level ground and the electronic controller 96 actively determines that the center of gravity 100 of the vehicle 20A together with its cumulative onboard load is safely situated behind the ground contact points of the two dolly wheels 48L and 48R and also in front of the ground contact points of the two rear drive wheels 56L and 56R, the electronic controller 96 will accordingly generate situation-specific electrical control signals and communicate the electrical control signals to the actuation system 90A. In response to the electrical control signals, the actuation system 90A will then mechanically adjust (i.e., pivot) the adjustable axle assembly 86A only if and as needed to thereby position the two rear drive wheels 56L and 56R in an optimal retracted (forward) fore-aft position as generally illustrated in FIG. 6A. By adjusting the two rear drive wheels 56L and 56R into an optimal retracted fore-aft position in this manner, the vehicle 20A is thereby provided with less inhibited to total uninhibited zero turn capability and therefore increased maneuverability. If, on the other hand, the electronic controller 96 actively determines that the center of gravity 100 has suddenly shifted directly over or behind the ground contact points of the two rear drive wheels 56L and 56R while the vehicle 20A is traveling up a hill, the electronic controller 96 will accordingly generate situation-specific electrical control signals and communicate the electrical control signals to the actuation system 90A. In response to the electrical control signals, the actuation system 90A will then mechanically adjust the adjustable axle assembly 86A only as far as necessary toward a fully extended fore-aft position as in FIG. 6B to thereby shift the ground contact points of the two rear drive wheels 56L and 56R back behind the center of gravity 100. In this way, the front end of the vehicle 20A is kept on the ground 103 and the overall balance of the vehicle 20A is thereby safely maintained as the vehicle 20A continues to travel up the hill.

In situations, for example, where a vehicle operator fully anticipates traveling up a steep hill or firmly believes that the electronic controller 96 is receiving improper electrical information signals from a suspected malfunctioning sensor, the vehicle operator may opt to utilize the operator control panel 98 to manually enter operator preference input regarding his choice for moving the pair of rear drive wheels 56L and 56R into a particular fore-aft position. Once the vehicle operator enters his particular fore-aft position preference, electrical operator preference input information signals are communicated to the electronic controller 96. In response to receiving such electrical operator preference input information signals, the electronic controller 96 then ignores all other electrical information signals and promptly communicates electrical control signals to the actuation system 90A in accordance with the particular preference of the vehicle operator. As a result, the fore-aft position of the pair of rear drive wheels 56L and 56R is ultimately adjusted to maintain the fore-aft stability of the vehicle 20A according to the vehicle operator's best judgment. Thus, in this way, a vehicle operator can utilize the operator control panel 98 to manually override the actively adjustable axle system 131A of the vehicle 20A as desired and as necessary.

In summary, the first embodiment 20A of the vehicle 20 according to the present invention realizes many advantages over other off-road or all-terrain vehicles, and particularly ZT Vehicles, commonly in use today. In particular, with its purposeful dimensioning, weight distribution, and predisposed center of gravity along with the actively adjustable axle system 131A, the vehicle 20A according to the present invention (1) successfully maintains its balance when traveling directly up a hill, (2) successfully maintains its balance when traveling across a hillside, (3) successfully maintains its balance even when a vehicle operator attempts rapid acceleration, (4) successfully maintains its balance when traveling over terrain with extreme and everchanging topographies, (5) successfully maintains its balance and optimizes traction even when there are significant and frequent changes in human load and/or object load onboard, (6) successfully maintains its balance even under reduced traction conditions, (7) is not unnecessarily limited in maximum zero turn capability when suited for use as a zero turn (ZT) vehicle, and (8) may successfully be adapted or suited for use as either a ZT vehicle or a non-ZT vehicle.

This concludes the detailed description of both the structure and operation of the first embodiment 20A of the vehicle 20 according to the present invention.

ALTERNATIVE EMBODIMENTS

Figure 7A:
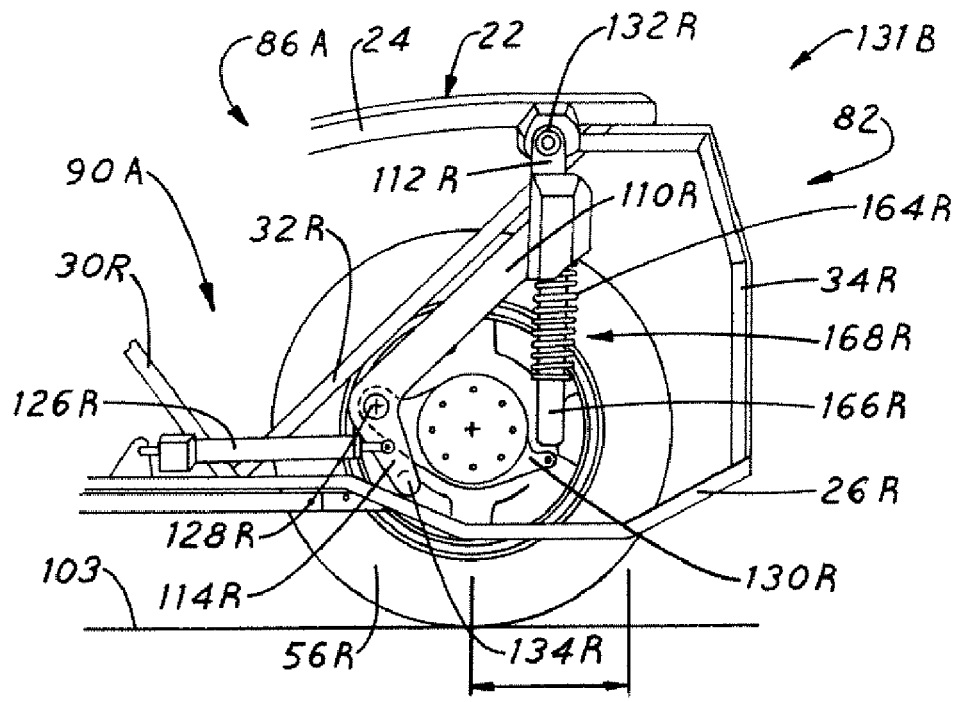
FIG. 7A is a cut-away side view of a telescoping cylinder actuation system engaged with an adjustable swing arm axle assembly included in an alternative embodiment of the vehicle according to the present invention, wherein the two rear drive wheels of the vehicle are in a fully retracted (forward) fore-aft position.
Figure 7B:
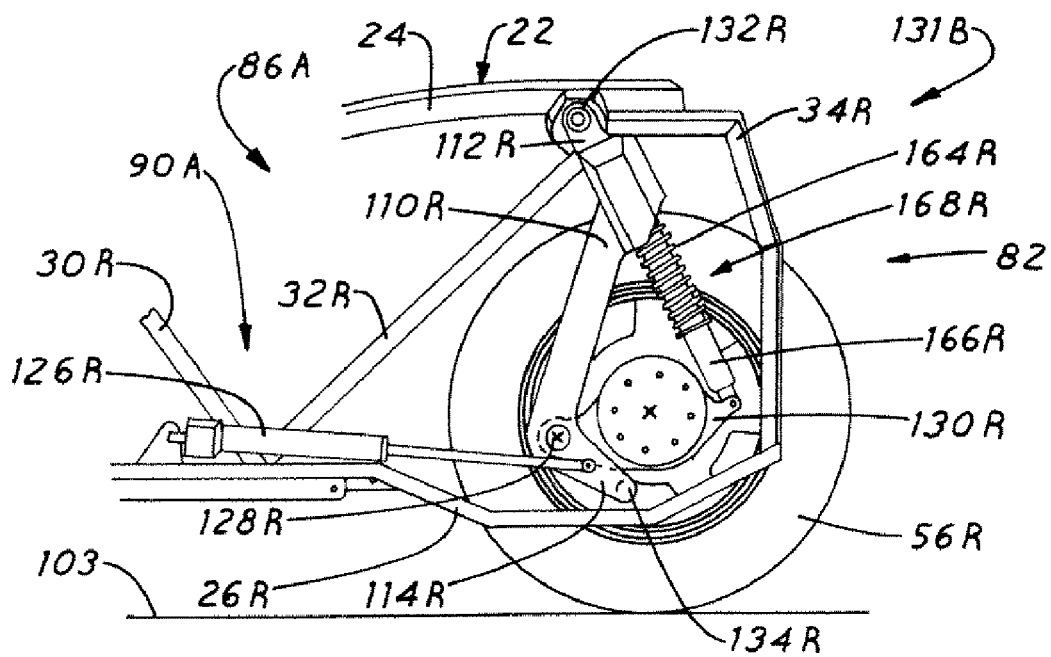
FIG. 7B is a cut-away side view of the telescoping cylinder actuation system engaged with the adjustable swing arm axle assembly depicted in FIG. 7A, wherein the two rear drive wheels of the vehicle are alternatively in a fully extended (rearward) fore-aft position.

An alternative embodiment 131B of the actively adjustable axle system 131 is illustrated in FIGS. 7A and 7B. As illustrated, the alternative embodiment 131B of the actively adjustable axle system 131, as does the first embodiment 131A, generally includes the first embodiment 86A of the adjustable axle assembly 86, the first embodiment 90A of the actuation system 90, and the electronic controller 96. However, in contrast to the first embodiment 131A, the two telescoping cylinders 126L and 126R of the actuation system 90A in this alternative embodiment 131B are instead connected between the frame 22 of the vehicle 20A and the two swing arms 110L and 110R proximate their distal ends 114L and 114R. In such a configuration, when the two telescoping cylinders 126L and 126R are fully contracted, the two swing arms 110L and 110R of the adjustable axle assembly 86A along with the two rear drive wheels 56L and 56R are thereby moved (i.e., pivoted) into a fully retracted (forward) fore-aft position as illustrated in FIG. 7A. On the other hand, when the two telescoping cylinders 126L and 126R are fully expanded, the two rear drive wheels 56L and 56R are thereby moved in a fully extended (rearward) fore-aft position as illustrated in FIG. 7B.

Figure 8A:
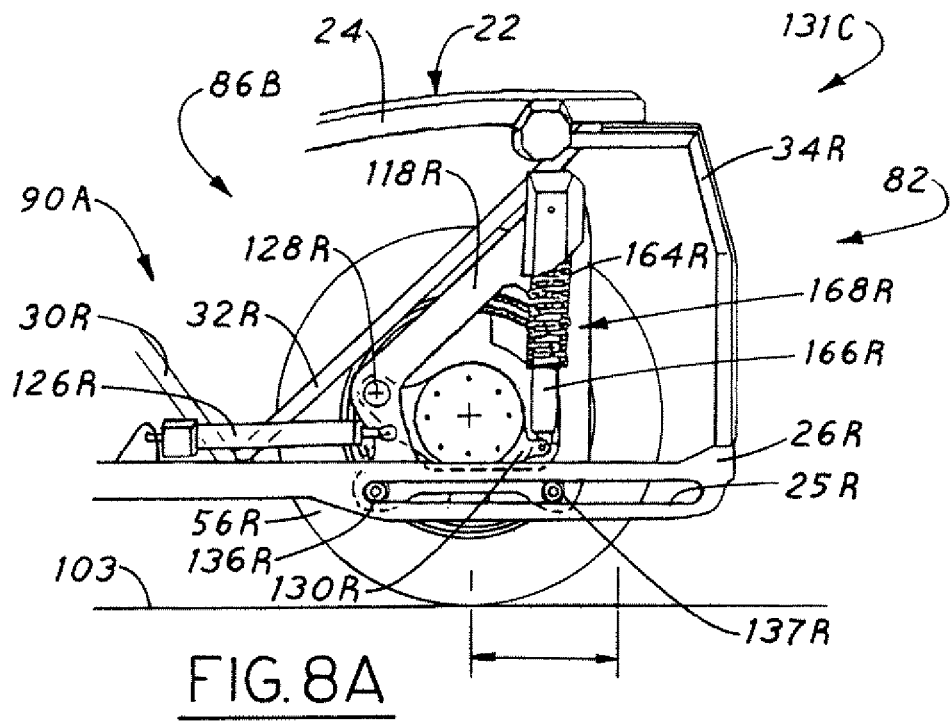
FIG. 8A is a cut-away side view of a telescoping cylinder actuation system engaged with an adjustable slide arm axle assembly included in another alternative embodiment of the vehicle according to the present invention, wherein the two rear drive wheels of the vehicle are in a fully retracted (forward) fore-aft position.
Figure 8B:
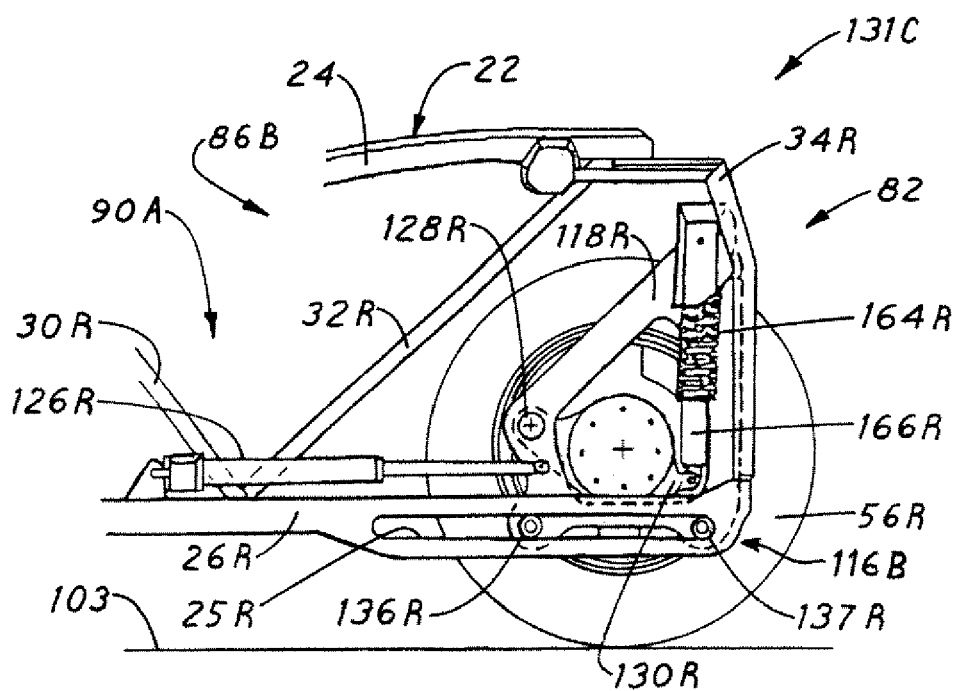
FIG. 8B is a cut-away side view of the telescoping cylinder actuation system engaged with the adjustable slide arm axle assembly depicted in FIG. 8A, wherein the two rear drive wheels of the vehicle are alternatively in a fully extended (rearward) fore-aft position.

Another alternative embodiment 131C of the actively adjustable axle system 131 is illustrated in FIGS. 8A and 8B. As illustrated, the actively adjustable axle system 131C includes a second embodiment 86B of the adjustable axle assembly 86, the first embodiment 90A of the actuation system 90, and the electronic controller 96. The adjustable axle assembly 86B itself includes a pair of slide arms (only the right slide arm 118R is shown) as well as a second embodiment 116B of the cross arm assembly 116. The two slide arms, first of all, are slidingly and respectively engaged within two slots (only the right slot 25R is shown) defined within the frame 22 of the vehicle 20A. The cross arm assembly 116B, in turn, includes a first cross arm (not shown) that interconnects the two slide arms at their respective first attachment points (only the first attachment point 136R of the right slide arm 118R is shown) and also a second cross arm (not shown) that similarly interconnects the two slide arms at their respective second attachment points (only the second attachment point 137R of the right slide arm 118R is shown). Given such an adjustable axle assembly 86B, the rear drive wheels 56L and 56R in this alternative embodiment 131C are instead rotatably suspended from these slide arms. The two telescoping cylinders 126L and 126R of the actuation system 90A, in cooperation therewith, are connected between the frame 22 of the vehicle 20A and these two slide arms. In such a configuration, when the two telescoping cylinders 126L and 126R are fully contracted, these two slide arms of the adjustable axle assembly 86B along with the two rear drive wheels 56L and 56R are thereby moved (i.e., slid) into a fully retracted (forward) fore-aft position as illustrated in FIG. 8A. On the other hand, when the two telescoping cylinders 126L and 126R are fully expanded, the two rear drive wheels 56L and 56R are thereby moved into a fully extended (rearward) fore-aft position as illustrated in FIG. 8B.

Figure 10:
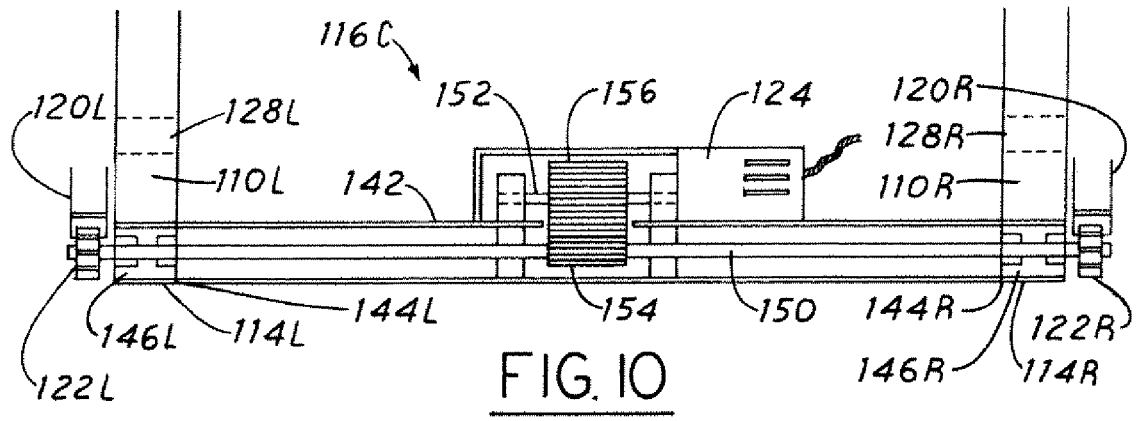
FIG. 10 is a rear sectional view of the rack-and-pinion actuation system along with a cross arm assembly of the adjustable swing arm axle assembly depicted in FIGS. 9A and 9B.

Still another embodiment 131D of the actively adjustable axle system 131 is illustrated in FIGS. 9A, 9B, and 10. As illustrated, the actively adjustable axle system 131D includes the first embodiment 86A of the adjustable axle assembly 86, a second embodiment 90B of the actuation system 90, and the electronic controller 96. The actuation system 90B itself includes a pair of racks 120L and 120R, a pair of pinion gears 122L and 122R, and an electric motor 124. The two racks 120L and 120R, first of all, are fixed to the frame 22 of the vehicle 20A. The two pinion gears 122L and 122R, in turn, are generally rotatably mounted to the distal ends 114L and 114R of the two swing arms 110L and 110R such that the two pinion gears 122L and 122R are engaged with the two racks 120L and 120R. The electric motor 124, lastly, is preferably a stepping-type motor that is electrically connected to the electronic controller 96 and thereby microprocessor-controlled.

In cooperation with such an actuation system 90B, the cross arm assembly 116 of the adjustable axle assembly 86A has a third embodiment 116C, as particularly illustrated in FIG. 10, adapted to include a hollow cross arm 142. The hollow cross arm 142, first of all, interconnects the two swing arms 110L and 110R in a fixed fashion at attachment points 144L and 144R. The hollow cross arm 142, in addition, includes a rotatable pinion shaft 150 within its hollow having opposite ends that are rotatably received and mounted within bearings 146L and 146R situated within the distal ends 114L and 114R of the two swing arms 110L and 110R. The two pinion gears 122L and 122R are both particularly fixed onto the rotatable pinion shaft 150 proximate the opposite ends thereof such that the two pinion gears 122L and 122R rotate in unison with the rotatable pinion shaft 150. Within such a cross arm assembly 116C, the electric motor 124, in addition to being electrically connected to the electronic controller 96, is also mounted onto the exterior of the hollow cross arm 142 in a fixed fashion such that a rotatable output drive shaft 152 protruding from the electric motor 124 is substantially parallel with the rotatable pinion shaft 150. Upon the protruding end of the rotatable output drive shaft 152, a primary drive gear 156 is fixed thereon such that the rotatable output drive shaft 152 and the primary drive gear 156 rotate in unison. A mating drive gear 154 fixed onto or integral with the middle portion of the rotatable pinion shaft 150 is meshingly engaged with the primary drive gear 156.

Within such a configuration as depicted in FIGS. 9A, 9B, and 10, the electronic controller 96 during operation is capable of communicating electrical control signals to the electric motor 124. In response, the electric motor 124 then "steps" or rotates the output drive shaft 152 along with the primary drive gear 156 in accordance with the electrical control signals received from the electronic controller 96. As both the output drive shaft 152 and the primary drive gear 156 rotate, the mating drive gear 154 engaged with the primary drive gear 156 accordingly causes concomitant rotation in both the pinion shaft 150 and the two pinion gears 122L and 122R fixed thereon. In this way, stepped or incremental movement of the two pinion gears 122L and 122R in either direction along the two racks 120L and 120R is ultimately realized. As a direct result, the adjustable axle assembly 86A is correspondingly moved (i.e., pivoted), thereby adjusting the fore-aft position of the two rear drive wheels 56L and 56R as necessary to actively maintain the fore-aft stability of the vehicle 20A during operation.

Figure 11:
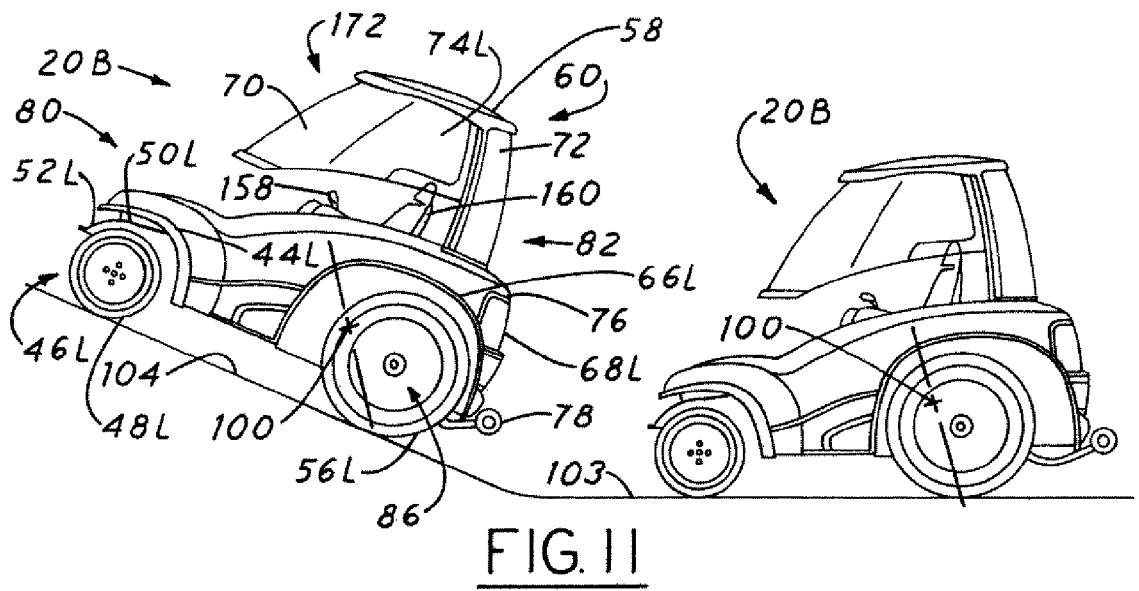
FIG. 11 is a side view of a second embodiment of the vehicle according to the present invention, wherein the vehicle is specifically implemented with two pairs of ground-interacting wheels suitable for traveling over uneven terrain.

A slightly alternative embodiment 20B of the vehicle 20 is illustrated in FIG. 11. As illustrated, the vehicle 20B includes a seat 160 for accommodating a vehicle operator within the vehicle operator cabin 172. In addition to the seat 160, the vehicle 20B also includes an operator steering control 158 incorporated within the operator control panel 98 (see FIG. 4) situated in the vehicle operator cabin 172. Furthermore, the vehicle 20B also includes a wheelie bar 78 mounted to the rear end 82 of the vehicle 20B for helping prevent the vehicle 20B from being altogether upended should the front end 80 of the vehicle 20B ever come off the ground when traveling up a steep hill.

As clearly demonstrated in FIG. 11, when the vehicle 20B is traveling over ground 103 that is substantially level, the actively adjustable axle system 131 will generally maintain the adjustable axle assembly 86 along with the two rear drive wheels 56L and 56R in a fully retracted (forward) fore-aft position. Such is appropriate, first of all, since the center of gravity 100 of the vehicle 20B with its cumulative onboard load as actively determined by the electronic controller 96 is safely situated behind the ground contact points of the two dolly wheels 48L and 48R and also just in front of the ground contact points of the two rear drive wheels 56L and 56R. That is, the center of gravity 100 of the vehicle 20B with its cumulative onboard load is safely situated over both the two dolly wheels 48L and 48R and the two rear drive wheels 56L and 56R such that the vehicle 20B will not tip over and become altogether upended and also such that maximum traction is realized by the two rear drive wheels 56L and 56R. Such is appropriate also because maintaining the rear drive wheels 56L and 56R in a fully retracted (forward) fore-aft position whenever feasible provides the vehicle 20B with enhanced, axle-centric balance for maximizing zero turn capability and therefore increased maneuverability. When, on the other hand, the vehicle 20B is traveling over ground 103 that includes uneven terrain 104 necessitating travel up a steep hill, the actively adjustable axle system 131 will then adjust the adjustable axle assembly 86 along with the two rear drive wheels 56L and 56R toward an extended (rearward) fore-aft position as necessary to thereby safely maintain the overall balance of the vehicle 20B. Any such necessary adjustment is timely initiated by the electronic controller 96 in response to its own active determination of the center of gravity 100 of the vehicle 20B with its cumulative onboard load.

Figure 12:
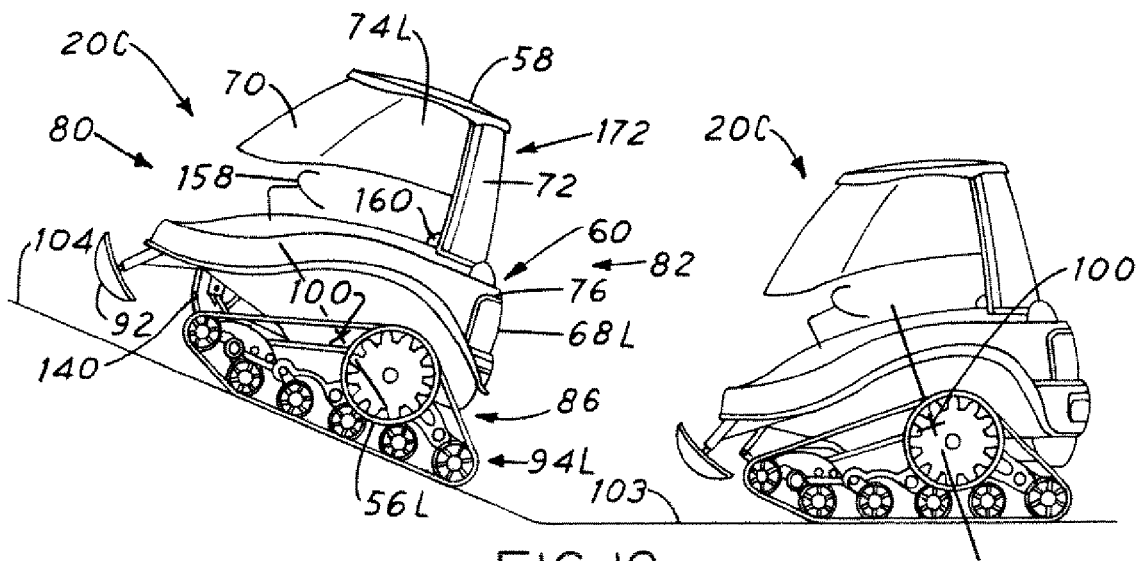
FIG. 12 is a side view of a third embodiment of the vehicle according to the present invention, wherein the vehicle is specifically implemented with a single a pair of ground-interacting track assemblies suitable for traveling over uneven terrain.

Another alternative embodiment 20C of the vehicle 20 is illustrated in FIG. 12. As illustrated, the vehicle 20C uniquely includes, first of all, an anti-tip disc 92 serving as a supplemental ground-interacting apparatus for the purpose of safety. In addition, the vehicle 20C also uniquely includes a pair of ground-interacting track assemblies (only the left track assembly 94L is shown). Such ground-interacting track assemblies are preferably mounted to both the adjustable axle assembly 86 and a forward suspension 140 of the vehicle 20C such that the two rear drive wheels 56L and 56R are respectively engaged within the two ground-interacting track assemblies to thereby facilitate moving interaction with the ground 103. As clearly demonstrated in FIG. 12, when the vehicle 20C is traveling over ground 103 that is substantially level, the actively adjustable axle system 131 will generally maintain the adjustable axle assembly 86 along with both the two rear drive wheels 56L and 56R and also the two track assemblies in a fully retracted (forward) fore-aft position. When, on the other hand, the vehicle 20C is traveling over ground 103 that includes uneven terrain 104 necessitating travel up a steep hill, the actively adjustable axle system 131 will then adjust the adjustable axle assembly 86 along with both the two rear drive wheels 56L and 56R and also the two track assemblies toward an extended (rearward) fore-aft position as necessary to thereby safely maintain the overall balance of the vehicle 20C.

This concludes the detailed description of both the structures and operations of alternative embodiments of the vehicle 20 according to the present invention.

While the present invention as described hereinabove was initially conceived in response to particular difficulties experienced with the performance and design of ZT vehicles, it is to be understood that the present invention is largely relevant and applicable to non-ZT vehicles as well. That is, many of the basic inventive principles implemented herein to improve the overall performance and design of ZT vehicles are applicable to many non-ZT vehicles as well. In particular, upon reading this invention disclosure, it is believed that one skilled in the art would readily realize that the inventive principles taught herein, for example, (1) actively determining the center of gravity of a vehicle with its cumulative onboard load to thereby maintain vehicle balance, (2) actively responding to shifts in vehicle attitude while the vehicle travels over extreme and everchanging terrain to thereby maintain vehicle balance, (3) actively responding to significant and frequent changes in human load and/or object load onboard the vehicle to thereby maintain vehicle balance, and (4) actively extending and/or retracting a two-wheeled axle of the vehicle as necessary to thereby optimize both vehicle maneuverability and vehicle balance, may also be applied to many non-ZT vehicles as well.

While having independent front or rear 2-wheel drive is primarily characteristic of ZT vehicles, it is to be understood that a vehicle pursuant to the present invention may alternatively have dependent front or rear 2-wheel drive capability, 4-wheel drive capability, or even all-wheel drive capability. In addition, with regard to suspension systems, a vehicle pursuant to the present invention may have an independent, nonindependent, or semi-independent suspension system. Also, with regard to suspension system springs, a vehicle pursuant to the present invention may, as an alternative to coil springs, instead include leaf springs, air springs, or torsion bar springs. Moreover, with regard to vehicle steering systems, a vehicle pursuant to the present invention may, as an alternative to having two dolly wheels and two wheels with independent 2-wheel drive, instead have two largely non-steerable wheels and two wheels directly steerable with a traditional linkage or rack-and-pinion steering system. Furthermore, with regard to the actuation system, it is to be understood that many different types of actuators may alternatively be utilized on a vehicle pursuant to the present invention, including, for example, hydraulic, electric, pneumatic, or mechanical linkage type actuators, or even combinations thereof. Lastly, any actuation system incorporating one or more of such actuators may optionally be designed to adjust the fore-aft positions of vehicle wheels either together in pairs or independently and individually pursuant to the present invention.

In summary, the vehicle with actively adjustable axle system for traveling over uneven terrain with a load, as described hereinabove within its various preferred embodiments according to the present invention, realizes many advantages over other off-road or all-terrain vehicles commonly in use today. In particular, the vehicle according to the present invention (1) successfully maintains its balance when traveling directly up a hill, (2) successfully maintains its balance when traveling across a hillside, (3) successfully maintains its balance even when a vehicle operator attempts rapid acceleration, (4) successfully maintains its balance when traveling over terrain with extreme and everchanging topographies, (5) successfully maintains its balance and optimizes traction even when there are significant and frequent changes in human load and/or object load onboard, (6) successfully maintains its balance even under reduced traction conditions, (7) is not unnecessarily limited in maximum zero turn capability when suited for use as a zero turn (ZT) vehicle, and (8) may successfully be adapted or suited for use as either a ZT vehicle or a non-ZT vehicle.

While the present invention has been described in what are presently considered to be its most practical and preferred embodiments and/or implementations, it is to be understood that the invention is not to be limited to the disclosed embodiments. On the contrary, the present invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle capable of traveling over uneven terrain with a load, said vehicle comprising:
    a frame having a front end, a rear end, and a fore-aft axis extending therebetween;
    a body mounted to said frame;
    an adjustable axle assembly mounted to said frame such that said adjustable axle assembly is aligned substantially orthogonal to said fore-aft axis;
    a pair of wheels rotatably mounted on the ends of said adjustable axle assembly such that said wheels are aligned substantially in parallel and are thereby capable of facilitating moving interaction with the ground;
    at least one supplemental ground-interacting apparatus mounted to said frame such that each said supplemental ground-interacting apparatus cooperates with said pair of wheels to thereby maintain clearance between both said frame and said body and said ground;
    an actuation system capable of mechanically adjusting said adjustable axle assembly to thereby adjust the fore-aft position of said pair of wheels relative to both said frame and said body; and
    an electronic controller mounted to said body and electrically connected to said actuation system;
    wherein said electronic controller is capable of communicating electrical control signals to said actuation system to thereby adjust said fore-aft position of said pair of wheels as necessary to actively maintain the fore-aft stability of said vehicle;
    wherein said adjustable axle assembly includes (i) a cross arm assembly and (ii) a pair of swing arms having pivotal ends pivotally mounted to said frame and distal ends interconnected with said cross arm assembly; and
    wherein said wheels are rotatably suspended from said swing arms proximate said distal ends.

2. A vehicle according to claim 1, wherein said actuation system includes:
    a pair of telescoping cylinders connected between said frame and said pair of swing arms;
    wherein said telescoping cylinders are electrically connected to said electronic controller so that said electronic controller is capable of communicating said electrical control signals to said telescoping cylinders to thereby adjust said fore-aft position of said pair of wheels as necessary to actively maintain said fore-aft stability of said vehicle.

3. A vehicle according to claim 1, wherein each said supplemental ground-interacting apparatus is a rotatable wheel assembly.

4. A vehicle according to claim 1, said vehicle further comprising:
    an operator control panel mounted to said body, electrically connected to said electronic controller, and capable of receiving operator preference input regarding said fore-aft position of said pair of wheels;
    wherein said operator control panel is capable of communicating electrical operator preference input information signals to said electronic controller to thereby adjust said fore-aft position of said pair of wheels as necessary to actively maintain said fore-aft stability of said vehicle.

5. A vehicle according to claim 1, said vehicle further comprising at least one attitude sensor mounted to said frame and electrically connected to said electronic controller.

6. A vehicle according to claim 1, said vehicle further comprising at least one load sensor mounted to said frame and electrically connected to said electronic controller.

7. A vehicle according to claim 1, said vehicle further comprising at least one position sensor mounted to said frame and electrically connected to said electronic controller.

* * * * *